US012604297B2

(12) United States Patent
Chen et al.

(10) Patent No.: US 12,604,297 B2
(45) Date of Patent: Apr. 14, 2026

(54) PAGING ALERT CHANNEL FOR A SATELLITE ACCESS NETWORK

(71) Applicant: Hughes Network Systems, LLC, Germantown, MD (US)

(72) Inventors: Liping Chen, Bethesda, MD (US); Lin-nan Lee, Potomac, MD (US); Neal D. Becker, Onley, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 319 days.

(21) Appl. No.: 18/224,608

(22) Filed: Jul. 21, 2023

(65) Prior Publication Data

US 2024/0179676 A1      May 30, 2024

Related U.S. Application Data

(60) Provisional application No. 63/429,099, filed on Nov. 30, 2022.

(51) Int. Cl.
H04W 68/00      (2009.01)
H04B 7/185      (2006.01)
H04W 68/02      (2009.01)
(52) U.S. Cl.
CPC ...... H04W 68/005 (2013.01); H04B 7/18547 (2013.01); H04W 68/02 (2013.01)
(58) Field of Classification Search
None
See application file for complete search history.

(56) References Cited

U.S. PATENT DOCUMENTS

| | | | |
|---|---|---|---|
| 10,694,493 B2 | 6/2020 | Yerramalli et al. | |
| 10,813,077 B2 * | 10/2020 | Martin | H04W 68/02 |
| 10,869,174 B2 | 12/2020 | Park et al. | |
| 10,904,861 B2 | 1/2021 | Hwang et al. | |
| 10,939,251 B2 | 3/2021 | Fujishiro et al. | |

(Continued)

FOREIGN PATENT DOCUMENTS

CN      108811085      11/2018

OTHER PUBLICATIONS

[No Author Listed], "RAN-R18-WS-non-eMBB-Qualcomm," Presented at the 3GPP TSG RAN Rel-18 Workshop, Virtual Event, Jun. 28-Jul. 2, 2021, 146 pages.

(Continued)

*Primary Examiner* — Adolf Dsouza
(74) *Attorney, Agent, or Firm* — Kilpatrick Townsend & Stockton LLP

(57) ABSTRACT

A communication device can perform discontinuous reception to intermittently monitor a wireless communication channel designated for receiving paging messages. The communication device determines that a synchronization signal for the wireless communication channel is not received during monitoring in the discontinuous reception. In response to the determination, the communication device monitors a paging alert channel designated for paging alerts. Such monitoring can include tuning a receiver of the communication device to selectively monitor the paging alert channel to receive signals during a series of frames such that the communication device accumulates repeated transmissions of paging alert signals sent in the series of frames.

20 Claims, 15 Drawing Sheets

(56) References Cited

U.S. PATENT DOCUMENTS

| | | | |
|---|---|---|---|
| 10,966,187 B2 | 3/2021 | Shin et al. | |
| 10,972,877 B2 | 4/2021 | Fujishiro et al. | |
| 10,979,996 B2 * | 4/2021 | Yang | H04L 1/1642 |
| 11,006,444 B2 | 5/2021 | Yi et al. | |
| 11,012,972 B2 | 5/2021 | Hong et al. | |
| 11,039,460 B2 | 6/2021 | Shin et al. | |
| 11,064,497 B2 | 7/2021 | Shin et al. | |
| 11,082,947 B2 | 8/2021 | Vajapeyam et al. | |
| 11,128,341 B2 | 9/2021 | Bhattad et al. | |
| 11,140,634 B2 | 10/2021 | Ye et al. | |
| 11,160,094 B2 | 10/2021 | Shin et al. | |
| 11,240,795 B2 | 2/2022 | Rico Alvarino et al. | |
| 11,290,957 B2 | 3/2022 | Lin et al. | |
| 11,452,066 B2 | 9/2022 | Chen et al. | |
| 11,533,710 B2 | 12/2022 | Wong et al. | |
| 11,778,608 B2 | 10/2023 | Shin et al. | |
| 11,805,485 B2 | 10/2023 | Shin et al. | |
| 11,825,473 B2 | 11/2023 | Blankenship et al. | |
| 11,838,892 B2 | 12/2023 | Cox et al. | |
| 12,302,282 B2 * | 5/2025 | Li | H04W 68/005 |
| 2018/0288734 A1 * | 10/2018 | Islam | H04W 74/0833 |
| 2019/0246254 A1 | 8/2019 | Chatterjee et al. | |
| 2021/0266985 A1 | 8/2021 | Sha et al. | |
| 2021/0385787 A1 | 12/2021 | Lee et al. | |
| 2022/0150830 A1 | 5/2022 | Hoglund et al. | |
| 2022/0295403 A1 | 9/2022 | Shrestha et al. | |
| 2022/0338159 A1 * | 10/2022 | Phuyal | H04W 24/10 |

OTHER PUBLICATIONS

Chen et al., "Procedure for Robust Notification Alert Delivery," Presented at the SA WG2 Meeting #S2-160, Chicago, Illinois, US, Nov. 13-17, 2019, 3 pages.

PCT Invitation to Pay Additional Fees and, Where Applicable, Protest Fee in International Appln. No. PCT/US2023/081163, mailed on Mar. 18, 2024, 12 pages.

[No Author Listed], "5G; NR; NR and NG-RAN Overall description; Stage-2," ETSI, Oct. 2022, 17.2.0:1-211.

[No Author Listed], "5G; NR; Physical layer measurements," ETSI, Jul. 2020, 16.2.0:1-29.

[No Author Listed], "5G; NR; Physical layer procedures for control, " ETSI, May 2022, 17.1.0:1-246.

[No Author Listed], "5G; NR; User Equipment (UE) procedures in idle mode and in RRC Inactive state," ETSI, May 2022, 17.0.0:1-51.

[No Author Listed], 5G; System architecture for the 5G System (5GS), ETSI, May 2022, 17.4.0:1-568.

[No Author Listed], "5G; System Architecture for the 5G System (5GS), " ETSI, Jan. 2021, 16.7.0:1-451.

[No Author Listed], "5G; System Architecture for the 5G System," ETSI, Jun. 2018, 15.2.0:1-218.

[No Author Listed], "LTE; Evolved Universal Terrestrial Radio Access (E-UTRA); Multiplexing and channel coding," ETSI, Apr. 2022, 17.1.0:1-263.

[No Author Listed], "LTE; Evolved Universal Terrestrial Radio Access (E-UTRA); Physical layer procedures," ETSI, Oct. 2022, 17.3.0:1-585.

[No Author Listed], "LTE; Evolved Universal Terrestrial Radio Access (E-UTRA); Radio Resource Control (RCC); Protocol specification," ETSI, May 2022, 17.0.0:1-1125.

[No Author Listed], "Narrowband Internet of Things," Rohde & Schwarz, Aug. 2016, 42 pages.

[No Author Listed], "NB-IoT Deployment Guide to Basic Feature set Requirements," GSMA, Jun. 2019, 51 pages.

[No Author Listed], "What is Narrowband IoT (NB-IoT)," Moko Wireless, Aug. 2022, 44 pages.

5gamericas.org [online], "The 5G Evolution: 3GPP Releases 16-17," available on or before Apr. 15, 2020, via Internet Archive: Wayback Machine URL <https://web.archive.org/web/20200415133321/https://www.5gamericas.org/wp-content/uploads/2020/01/5G-Evolution-3GPP-R16-R17-FINAL.pdf>, retrieved on Mar. 4, 2024, URL <https://www.5gamericas.org/wp-content/uploads/2020/01/5G-Evolution-3GPP-R16-R17-FINAL.pdf>, 54 pages.

Do et al., "Study the Coexistence NB-IoT Paging and LTE Paging on eNodeB," Presented at the Proceedings of the 2020 IEEE Eighth International Conference on Communications and Electronics, Phu Quoc Island, Kien Giang, Vietnam, Jan. 13-15, 2021, 80-84.

hal.science [online], "A Tutorial on NB-IoT Physical Layer Design," available on or before Feb. 27, 2024, via Internet Archive: Wayback Machine URL <https://web.archive.org/web/20240227145701/https://hal.science/hal-02952155/file/ieee_tutorial_correction_hal.pdf>, retrieved on Mar. 4, 2024, URL <https://hal.science/hal-02952155/file/ieee_tutorial_correction_hal.pdf>, 40 pages.

Kavuri, "Performance Assessment of Narrowband IoT for Intelligent Cargo Transportation," Tampere University, Feb. 2019, 65 pages.

Lin et al., "5G from Space: An Overview of 3GPP Non-Terrestrial Networks, " CoRR, Submitted on Oct. 2021, arVix:2103.09156, 8 pages.

Manzoor et al., "IoT Coverage Enhancement using Repetition in Energy Constrained Devices: an Analytic Approach," CoRR, Submitted on Mar. 2022, arVix:2203.05689, 10 pages.

Martinez et al., "Exploring the Performance Boundaries of NB-IoT" CoRR, Submitted on Feb. 2019, arVix:1810:00847, 10 pages.

Matz et al., "A Systematic Analysis of Narrowband IoT Quality of Service," Sensors, Mar. 2020, 20(1636):1-26.

sharetechnote.com [online], "4G/LTE-NB," available on or before Nov. 11, 2017, via Internet Archive: Wayback Machine URL <https://web.archive.org/web/20171111174349/https://www.sharetechnote.com/html/Handbook_LTE_NB_TBS_MCS.html>, retrieved on Mar. 5, 2024, URL <https://www.sharetechnote.com/html/Handbook_LTE_NB_TBS_MCS.html>, 3 pages.

Stork, "Power Saving with NB-IoT," LinkedIn, Jul. 2020, 8 pages.

Tabbane, "IoT Standards, Part II: 3GPP Standards," Presented at the Proceedings of the International Telecommunication Union Training on Planning Internet of Things (IoTs) Networks, Sep. 25-28, 2018, Bandung, West Java, Indonesia, 130 pages.

Wang et al., "A Primer on 3GPP Narrowband Internet of Things (NB-IoT)," CoRR, Submitted on Jun. 2016, arVix:1606.04171, 8 pages.

Wang et al., "Paging-Efficient NB-IoT Resource Allocation for Massive-Connectivity-Enabled Communications in Smart Grid" Presented at the Proceedings of the 2019 IEEE International Conference on Energy Internet, Nanjing, Jiangsu, China, May 27-31, 2019, 227-231.

wikipedia.com [online], "Narrowband IoT," available on or before Dec. 22, 2023, via Internet Archive: Wayback Machine URL <https://web.archive.org/web/20231222231549/https://en.wikipedia.org/wiki/Narrowband_IoT>, retrieved on Mar. 4, 2024, URL <https://en.wikipedia.org/wiki/Narrowband_IoT>, 6 pages.

International Search Report and Written Opinion in International Appln. No. PCT/US2023/081163, mailed on May 10, 2024, 19 pages.

* cited by examiner

Table 2: Downlink Transport Block Size (TBS)

| $I_{TBS}$ | $I_{SF}$ | | | | | | | |
|---|---|---|---|---|---|---|---|---|
| | 0 | 1 | 2 | 3 | 4 | 5 | 6 | 7 |
| 0 | 16 | 32 | 56 | 88 | 120 | 152 | 208 | 256 |
| 1 | 24 | 56 | 88 | 144 | 176 | 208 | 256 | 344 |
| 2 | 32 | 72 | 144 | 176 | 208 | 256 | 328 | 424 |
| 3 | 40 | 104 | 176 | 208 | 256 | 328 | 440 | 568 |
| 4 | 56 | 120 | 208 | 256 | 328 | 408 | 552 | 680 |
| 5 | 72 | 144 | 224 | 328 | 424 | 504 | 680 | |
| 6 | 88 | 176 | 256 | 392 | 504 | 600 | | |
| 7 | 104 | 224 | 328 | 472 | 584 | 680 | | |
| 8 | 120 | 256 | 392 | 536 | 680 | | | |
| 9 | 136 | 296 | 456 | 616 | | | | |
| 10 | 144 | 328 | 504 | 680 | | | | |
| 11 | 176 | 376 | 584 | | | | | |
| 12 | 208 | 440 | 680 | | | | | |

No of sub-frames

| $I_{SF}$ | $N_{SF}$ |
|---|---|
| 0 | 1 |
| 1 | 2 |
| 2 | 3 |
| 3 | 4 |
| 4 | 5 |
| 5 | 6 |
| 6 | 8 |
| 7 | 10 |

| | 410a | 410b | 410c | 410d |
|---|---|---|---|---|
| Repetition Control Bits (binary) | 2b'00 | 2b'01 | 2b'10 | 2b'11 |
| Repetition Number | 30 | 60 | 120 | 240 |
| Burst Duration (ms) | 60 | 120 | 240 | 480 |
| Burst Duration with overhead (ms) | 80 | 160 | 320 | 640 |
| Repetition Gain with AWGN (dB) | 14.77 | 17.78 | 20.79 | 23.80 |
| Throughput (bps) | 600 | 300 | 150 | 75 |
| Frame Number Per Paging Alert Message (FNPPM) | 8 | 16 | 32 | 64 |
| Paging Alerts Per Alert Cycle of 1024 Frames (PAPAC) | 128 | 64 | 32 | 16 |

```
MasterInformationBlock-NB ::=          SEQUENCE {
901→  systemFrameNumber-MSB-r13              BIT STRING (SIZE (4)),
902→  hyperSFN-LSB-r13                       BIT STRING (SIZE (2)),
903→  schedulingInfoSIB1-r13                 INTEGER (0..15),
904→  systemInfoValueTag-r13                 INTEGER (0..31),
905→  ab-Enabled-r13                         BOOLEAN,
906→  operationModeInfo-r13                  CHOICE {
          inband-SamePCI-r13                   Inband-SamePCI-NB-r13,
          inband-DifferentPCI-r13              Inband-DifferentPCI-NB-r13,
          guardband-r13                        Guardband-NB-r13,
          standalone-r13                       Standalone-NB-r13
      },
907→  additionalTransmissionSIB1-r15  BOOLEAN,
908→  ab-Enabled-5GC-r16              BOOLEAN,
909→  partEARFCN-r17                  CHOICE {
          spare                         BIT STRING (SIZE (2)),
          earfcn-LSB                     BIT STRING (SIZE (2))
      },
910→  spare                          BIT STRING (SIZE (6))
}
```

FIG. 9

```
                                        1000
MasterInformationBlock-NB ::=    SEQUENCE {
1001→  systemFrameNumber-MSB-r13     BIT STRING (SIZE (4)),        (4 bits)
1002→  hyperSFN-LSB                  BIT STRING (SIZE (4)),        (4 bits)
1003→  systemInfovalueTag-r13        INTEGER (0..31),             (5 bits)
1004→  ab-Enabled-r13               BOOLEAN,                      (1 bit)
1005→  operationModeInfo-r13        CHOICE {                      (2 bits+5)
            inband-SamePCI-r13          Inband-SamePCI-NB-r13,
            inband-DifferentPCI-r13     Inband-DifferentPCI-NB-r13,
            guardband-r13               Guardband-NB-r13,
            standalone-r13              Standalone-NB-r13
       },
1006→  ab-Enabled-5GC-r16           BOOLEAN,                      (1 bit)
1007→  partEARFCN-17                CHOICE {                      (1 bit+2)
            spare                       BIT STRING (SIZE (2)),
            earfcn-LSB                  BIT STRING (SIZE (2))
       },
1008→  alertChannelRepetitionNum    ENUMERATED {30, 60, 120, 240}          (2 bits)
1009→  alertCyclePeriod             ENUMERATED {128, 256, 512, 1024,
                                     2048, 4096, 8192, 16384}              (3 bits)
1010→  POmissNumberbeforeAlertChannel  INTEGER (0..7)                     (3 bits)
1011→  AlertShortMessage            ENUMERATED {yes, no}                   (1 bit)
} total 34 bits
```

```
MasterInformationBlock-NB ::=    SEQUENCE {
1001 → systemFrameNumber-MSB-r13       BIT STRING (SIZE (4)),        (4 bits)
1002 → hyperSFN-LSB-r13                BIT STRING (SIZE (4)),        (4 bits)

1003 → systemInfoValueTag-r13         INTEGER (0..31),              (5 bits)
                             },
1006 → ab-Enabled-5GC-r16             BOOLEAN,                      (1 bit)

1008 → alertChannelRepetitionNum         ENUMERATED {30, 60, 120, 240}  (2 bits)
1009 → alertCyclePeriod              ENUMERATED {128, 256, 512, 1024,   (3 bits)
                                        2048, 4096, 8192, 16384}        (3 bits)
1010 → POmissNumberbeforeAlertChannel INTEGER (0..7)                   (3 bits)
1011 → AlertShortMessageType          ENUMERATED {SIU, PWS/ETWS}       (1 bit)

spare                         BIT STRING (SIZE (1))        (1 bit)
} total 24 bits
```

FIG. 11

PAGING ALERT CHANNEL FOR A SATELLITE ACCESS NETWORK

CROSS-REFERENCE TO RELATED APPLICATIONS

This application claims priority to U.S. Provisional Patent Application No. 63/429,099, filed on Nov. 30, 2022, the entirety of which is incorporated by reference herein.

BACKGROUND

The present specification relates to paging in wireless communication systems.

Many communication systems perform paging to notify wireless communication devices of an incoming call or message. Examples of wireless communication devices include User Equipment (UE) such as a smartphone, a tablet computer, a laptop computer, or another type of wireless device. When a UE is not transmitting or receiving data, the UE generally enters an idle mode to conserve power. Paging enables the communication system to direct an incoming call or message to a UE that is in idle mode. However, if the signal-to-noise ratio is very low for the UE, the UE may not successfully receive a paging signal and thus may not receive an incoming call or message.

SUMMARY

In some implementations, a communication system includes features to enhance the reliability and coverage of paging to communication devices. The system can be configured to send paging signals to UEs in a standard or primary paging mode. In some cases, a UE may have a signal-to-noise ratio (SNR) that is too low to successfully receive a paging signal. To notify the UE even with a low SNR, the system can send paging alerts on a dedicated alert channel when standard paging is ineffective. Multiple paging alert messages can be sent over time with a predetermined pattern and timing, so the UE can accumulate received signals over multiple transmissions to effectively boost the received power of the alert message. As a result, the UE can receive paging alert messages even when the SNR is too low to receive standard paging messages. The pattern and timing for alert messages can be configured by an operator of the system and can be changed from time to time as needed.

The communication system can employ satellites and terrestrial gateways in a Radio Access Network (RAN) to provide network connectivity to UEs through the 3GPP 5G new radio (NR) non-terrestrial network (NTN) ("5GNR-NTN") framework. The system can assign a dedicated physical downlink alert channel (PDACH) (also as the "paging alert channel" or "alert channel") that can be allocated in the 5GNR-NTN spectrum to assist paging from both the core network (CN) and the radio access network (RAN) that includes the satellites. The UE and the network infrastructure can both perform operations to make coordinate the functions needed to make the paging alert channel effective. The network and the UE can each calculate the timing at which paging alert messages should be sent to the UE. As a result, the network sends the series of paging alert messages at the appropriate times and the UE tunes to receive the paging alert messages at the appropriate times.

The UEs can be configured to receive and respond to standard paging messages when signal strength is sufficient, and also to switch to monitoring the paging alert channel when standard paging is unavailable. When a UE is operating in an inactive or idle state, the UE can intermittently receive data and receive a paging message if one is transmitted. However, if the UE cannot detect the synchronization signals needed for standard monitoring and network connection, the UE can determine that standard paging is unavailable and can monitor the alert channel in response. For example, if the UE wakes up from discontinuous reception (DRX) or extended discontinuous reception (eDRX) and cannot detect a Synchronization Signal Block (SSB), a Primary Synchronization Signal (PSS), and/or Synchronization Signal (SS) continuously for a certain duration, the UE will tune to the dedicated alert channel to monitor the alert channel for paging alert messages designated for the UE. The UE calculates the times that paging alert messages intended for the UE would be sent, and accumulates received signals at those times to increase the effective SNR of reception by significant amounts. Depending on the number of repetitions, the effective SNR for receiving paging alerts can be boosted by 5 dB, 10 dB, 20 dB, or more, which enables the UE to receive paging alerts on the paging alert channel even when signal strength is too attenuated for the UE to receive transmissions on, for example, the Paging Control Channel (PCCH), Paging Channel (PCH), Physical Downlink Control Channel (PDCCH) and/or Physical Downlink Shared Channel (PDSCH).

The network can also switch from standard paging to using the paging alert channel when standard paging messages are not effective. For example, the network can have an Access and Mobility Management Function (AMF) as a control plane network function of the 5G core network (5GC). To page a UE, the AMF can coordinate paging so that each Next Generation NodeB (gNB) in a tracking area that includes the UE transmits paging messages to the UE, e.g., on the PCCH, PCH, PDCCH, and/or PDSCH. The gNBs may be associated with or integrated with terrestrial gateways to provide network connectivity via satellite. If the UE does not have sufficient signal quality to detect the paging message, the UE may not respond (e.g., not send a Radio Resource Request (RRC) setup request, not transmit an acknowledgement (ACK) or negative acknowledgement (NACK)). After the UE does not respond to a predetermined number of paging messages, the AMF and gNBs may initiate transmission of paging alert messages on the paging alert channel. For example, after paging is attempted for a certain duration (e.g., a predetermined number of attempts), the AMF of the core network and/or the RAN can begin using the alert channel to send paging alert messages to the UE. The alert channel takes advantage of repetition and a low code rate to extend operational SNR greatly. For example, the paging alert data sent over the alert channel can be sent repeatedly (e.g., 30 times, 60 times, etc.), and the UE can accumulate signals over the various repetitions to successfully receive the paging alert message.

The paging alert channel provides a number of features that provide versatility and adaptability in sending paging alerts. For example, the system can select from among multiple different numbers of repetitions of paging alert messages. Various options for the amount of repetition for paging alert messages can be defined in advance. From those options, the system can select the number of repetitions that is most appropriate for signal conditions in an area (e.g., for a particular satellite beam). The system can set the number of repetitions for each beam individually, and can adjust the number of repetitions over time based on the measured SNR for the beam and/or changes in the number of UEs that need to connect. For example, the number of repetitions can be adjusted for different satellite beams, with each beam having the number of repetitions set based on the end of coverage SNR for the beam. As a result, beams where SNR is lower can have higher numbers of repetitions selected to provide a greater boost to effective receiving power, while beams with higher SNR can have lower numbers of repetitions. The ability to select the number of repetitions also can adjust a tradeoff between a level of signal enhancement and capacity. For example, although lower numbers of repetitions may provide lower levels of received power, they occupy a lower total duration of transmission time and so allows time for paging alerts for more UEs.

The various options for the number of repetitions can be set so that some or all of the options align with frame boundaries. For example, to enhance scheduling, the repetition options can be based on a base number of repetitions (e.g., 30) that aligns with frame boundaries, and other options can be multiples of this base number (e.g., 60, 120, 240, etc.) so that they also align with frame boundaries.

The system can send alert channel control messages in a master information block for the paging alert channel, referred to as an alert master information block (AMIB), to inform UEs of the parameters for using the paging alert channel. For example, the AMIB can indicate the number of repetitions for each sequence of paging alert messages and the interval between transmissions in a sequence of paging alert messages. The parameters can vary for different satellite beams, and the content of the AMIBs can differ accordingly so that each AMIB indicates the parameters for the paging alert channel in the corresponding beam. The AMIB can maintain compatibility with Narrow Band Internet of Things (NB-IOT) and/or 5G standards, so that the same encoders and decoders can be used. For example, the AMIB for the paging alert channel can have structure and contents as a modified version of the MIB for Narrow Band Internet of Things (NB-IOT) communications.

The network infrastructure and the UEs can each calculate the timing for paging alert messages to coordinate transmission and reception. For example, paging alert messages for a UE can be started at a time that is determined based on a user identifier for the UE, such as the 5G S-Temporary Mobile Subscriber Identity (5G-S-TMSI), which is a shortened version of the 5G NR Global Unique Temporary Identifier (5G-GUTI). Paging alert messages for a UE can be sent as a series of messages, consistently spaced apart by an interval that is selected for the paging alert channel and specified in the MIB sent to the UE. The sequences of paging alert messages for different UEs can start at different times, e.g., at different sub-frame positions in a series of frames. The network (e.g., core network, gNB or satellite gateway) can use the identifier for a UE to determine the time to begin transmission of the sequence of paging alerts, such as at a particular position of a frame counter and/or hyperframe counter. UEs each perform the same calculation based on their respective identifiers, to calculate the starting position in the series of frames that would begin a series of messages intended for them. As a result, the network infrastructure can deterministically calculate the timing to transmit paging alert messages for a UE, and the UE can also deterministically calculate the same timing so the UE can tune to receive the alert messages.

The system can schedule the paging alert messages so that multiple UEs share the same time periods (e.g., the same sets of sub-frames) to receive alert messages. Allowing groups of UEs to share the same time periods for receiving paging alerts maximizes the capacity of the paging alert channel. In general, it is relatively uncommon that UEs would need to be contacted on the paging alert channel at the same time, and so sharing time periods for paging alert messages typically does not cause significant delays in notifying UEs.

In one general aspect, a method performed by one or more communication devices includes: identifying, by the one or more communication devices, a user equipment to be paged; causing, by the one or more communication devices, one or more paging messages to be transmitted to the user equipment; determining, by the one or more communication devices, that a response to the one or more paging messages is not received from the user equipment; and in response to determining that a response to the one or more paging messages is not received from the user equipment, causing, by the one or more communication devices, a paging alert message for the user equipment to be transmitted on a paging alert channel designated for transmitting paging alerts, wherein the paging alert message comprises repeated paging alert signals for the user equipment.

Implementations of this and other aspects can include any of the following features, in any combination or subcombination.

In some implementations, the paging alert message for the user equipment comprises a plural number of consecutive instances of the paging alert signals for the user equipment.

In some implementations, the paging alert signals indicate an identifier for the user equipment.

In some implementations, the method includes: encoding the identifier for the user equipment; and modulating the encoded identifier for the user equipment. The paging alert signals comprise the modulated encoded identifier.

In some implementations, the method includes causing, by the one or more communication devices, an alert master information block (AMIB) for the paging alert channel to be transmitted, wherein the AMIB includes data indicating (i) a number of repetitions of paging alert signals in individual paging alert messages or a duration of individual paging alert messages, and (ii) a duration of an alert cycle for the paging alert channel.

In some implementations, the AMIB includes (i) at least a portion of a system frame number (SFN) and (ii) at least a portion of a hyper frame number (HyperSFN).

In some implementations, the AMIB includes a short message paging indicator value that specifies whether a short message is pending for a receiver.

In some implementations, the short message paging indicator value specifies whether a receiver should tune to receive system information blocks (SIBs) for a public safety message or a system update.

In some implementations, the short message paging indicator is a single bit.

In some implementations, the method includes: causing, by the one or more communication devices, an alert master information block (AMIB) for the paging alert channel to be transmitted, wherein the alert master information block for the paging alert channel specifies an alert cycle duration indicating a length of an alert cycle for the paging alert channel; and providing multiple paging alert messages to the communication device on the paging alert channel, wherein the multiple paging alert messages are spaced apart by a multiple of the alert cycle duration indicated in the AMIB.

In some implementations, the method includes: determining a repetition control value that indicates a number of times that paging alert signals are repeated in a paging alert message; and causing, by the one or more communication devices, an alert master information block (AMIB) for the paging alert channel to be transmitted, wherein the alert master information block for the paging alert channel includes the repetition control value. The paging alert message for the user equipment includes the paging alert signals repeated the number of times indicated in the repetition control value of the AMIB.

In some implementations, determining the repetition control value comprises selecting a repetition control value from among a predetermined set of multiple repetition control values, wherein each of the repetition control values represents a different number of repetitions of paging alert signals in a paging alert message.

In some implementations, the method includes determining an end-of-coverage signal-to-noise ratio for a satellite beam. The repetition control value is selected based on the determined end-of-coverage signal signal-to-noise ratio.

In some implementations, the predetermined set of multiple repetition control values includes a first repetition control value representing a first number of repetitions and one or more additional repetition control values that are integer multiples of the first number of repetitions.

In some implementations, the multiple repetition control values respectively represent different numbers of repetitions that are each represent a transmission duration that aligns with frame boundaries of a frame structure.

In some implementations, the method includes causing, by the one or more communication devices, a synchronization signal to be transmitted on the paging alert channel.

In some implementations, the method includes: determining, by the one or more communication devices, an identifier for the user equipment; and determining, by the one or more communication devices, a time to transmit the paging alert message based on the identifier. Causing the paging alert message for the user equipment to be transmitted on the paging alert channel comprises causing the paging alert message to be transmitted on the paging alert channel at the determined time.

In some implementations, determining the time to transmit the alert message comprises determining an alert frame in which to transmit the paging alert message, wherein the alert frame is determined based on the identifier and a number of paging alerts per alert cycle.

In some implementations, determining the time to transmit the alert message comprises determining an offset that indicates a number of frames from a beginning of a paging alert cycle at which to transmit the paging alert message.

In some implementations, transmission of the paging alert message for the user equipment is a first transmission of the paging alert message, and the first transmission of the paging alert message is made in a first alert cycle, wherein the first transmission of the paging alert message is made at a particular offset from a beginning of the first alert cycle. The method comprises causing, by the one or more communication devices, a second transmission of the paging alert message, wherein the second transmission of the paging alert message is made in a second alert cycle that follows the first alert cycle, wherein the second transmission of the paging alert message is made at the particular offset from a beginning of the second alert cycle.

In some implementations, the method includes: causing, by the one or more communication devices, paging alert messages to be transmitted in a series of multiple paging alert cycles that each have a same alert cycle duration; and causing, by the one or more communication devices, multiple paging alert messages for the user equipment to be transmitted at multiples of the alert cycle duration.

In some implementations, the paging alert channel comprises a dedicated physical resource block of a 5G new radio (NR) (5G NR) carrier.

In some implementations, the paging alert channel comprises a physical resource block of a 5G carrier, and wherein signals are transmitted on the physical resource block of the paging alert channel either at the same power as or at a higher power than other physical resource blocks of the 5G carrier.

In some implementations, the one or more paging messages are transmitted to the user equipment using a 5G paging channel (PCH), 5G paging control channel (PCCH), physical downlink control channel (PDCCH) or physical downlink shared channel (PDSCH); and the paging alert channel comprises a dedicated physical resource of a 5G carrier and is separate from the PCH, PCCH, PDCCH and PDSCH.

In some implementations, identifying the user equipment to be paged comprises receiving data indicating an incoming call for the user equipment or a message for the user equipment.

In some implementations, the paging alert channel is a downlink-only channel.

In some implementations, the one or more communication devices include at least one of a core network, a cellular base station, or a terrestrial gateway for a satellite network.

In some implementations, the method includes: identifying multiple user equipment (UEs) to be alerted using the paging alert channel; determining, for each UE of the multiple UEs, a corresponding time position in an alert cycle in which to send a paging alert message to the UE, wherein the time position in the alert cycle for each UE is based on the identifier of the UE; and causing, for each of the multiple UEs, a paging alert message to be transmitted to the UE in the corresponding time position in the alert cycle corresponding to the UE, wherein, for each of the UEs, the paging alert message for the UE comprises multiple repetitions of paging alert signals for the UE.

In some implementations, the method includes: causing paging alert messages to be provided for each of multiple user equipment (UEs) in alert frames of an alert cycle that repeats and has a predetermined duration, each instance of the alert cycle comprising a predetermined number of alert frames that each represent the duration of a single paging alert message; and determining alert frames in which to transmit paging alert messages for the multiple UEs based on respective identifiers for the multiple UEs, wherein transmissions of paging messages for a first UE of the multiple UEs are spaced apart with transmissions of paging alert messages for other UEs being made at intervening alert frames.

In some implementations, paging alert messages are transmitted in a series of alert frames, wherein each alert frame represents a duration of a paging alert message, wherein the series of alert frames forms an alert cycle, and wherein the alert cycle is repeated; and multiple user equipment (UEs) are distributed among different alert groups, wherein the different alert groups are assigned different alert frames in the alert cycle, and wherein the UEs in each alert group share the same alert frame in the alert cycle.

In some implementations, the UEs are assigned to the alert groups based on identifiers for the UEs.

In some implementations, for each of the alert groups, paging alert messages for the UEs in the alert group are transmitted in the alert frame assigned to the alert group.

In some implementations, a first alert group of the different alert groups is assigned a first alert frame in the alert cycle. The method comprises: identifying a plurality of UEs in the first alert group that each have not acknowledged a page for an incoming call; and causing paging alert messages for different UEs of the identified plurality of UEs to be transmitted in successive instances of the alert cycle, wherein, in each of the successive instances of the alert cycle, a single paging alert message for one of the identified plurality of UEs is transmitted in the first alert frame assigned to the first alert group.

In some implementations, when multiple UEs in an alert group are to be notified about respective incoming calls, the alert frame for the alert group is used to send paging alert messages for different UEs in the alert group in successive alert cycles, such that the system uses the alert frame for the alert group to cycle through paging alert notifications the multiple UEs to be notified about respective incoming calls.

In some implementations, a first alert group of the different alert groups is assigned a first alert frame in the alert cycle. The method comprises: identifying a plurality of UEs in the first alert group that each have not acknowledged a page for an incoming call; and cycling through the identified plurality of UEs over successive instances of the alert cycle to change, from one instance of the alert cycle to the next, which of the identified plurality of UEs is provided a paging alert message in the first alert frame assigned to the first alert group.

In some implementations, the method includes causing the paging alert message for the user equipment to be transmitted on the paging alert channel multiple times until at least one of (i) a transmission from the user equipment is received or (ii) the number of times that the paging alert message for the user equipment is transmitted reaches a threshold.

In another general aspect, a system comprises: one or more processors; and one or more computer-readable media storing instructions that are operable, when executed by the one or more processors, to cause one or more communication devices to perform the operations of any of the methods.

In another general aspect, one or more non-transitory computer-readable media storing instructions that are operable, when executed by one or more processors, to cause one or more communication devices to perform operations of any of the methods.

In a another general aspect, a method performed by a communication device includes: operating, by the communication device, in an idle or inactive state; performing, by the communication device, discontinuous reception to intermittently monitor a wireless communication channel designated for receiving paging messages; determining, by the communication device, that a synchronization signal for the wireless communication channel is not received during monitoring in the discontinuous reception; and in response to the determination, monitoring, by the communication device, a paging alert channel designated for paging alerts, wherein the monitoring comprises tuning a receiver of the communication device to selectively monitor the paging alert channel to receive signals during a series of frames such that the communication device accumulates repeated transmissions of paging alert signals sent in the series of frames.

Implementations of this and other aspects can include any of the following features, in any combination or subcombination.

In some implementations, the paging alert channel is a downlink-only channel that does not require transmission of an acknowledgement to receiving paging alert messages.

In some implementations, the method includes: receiving a paging alert message on the paging alert channel, wherein the paging alert message comprises a burst comprising a predetermined number of repetitions of paging alert signals;

and accumulating the repetitions of the paging alert signals in the paging alert message to receive the paging alert signals at a signal-to-noise ratio (SNR) that is lower than a minimum SNR at which the communication device can receive a single transmission of the paging alert signals.

In some implementations, the synchronization signal is a 5G NR synchronization signal block (SSB); the paging alert channel includes synchronization signaling separate from the 5G NR synchronization signal block (SSB); and the method comprises using the synchronization signaling in the paging alert channel to maintain synchronization to a network before extracting an alert master information block for the paging alert channel.

In some implementations, the paging alert channel is provided using a 5G NR carrier.

In some implementations, the paging alert channel is allocated a same power level for transmission as one or more other portions of the 5G NR carrier.

In some implementations, the paging alert channel is allocated a different power level for transmission than one or more other portions of the 5G NR carrier.

In some implementations, the paging alert channel is provided using a particular physical resource block of a 5G NR carrier that has multiple resource blocks; and transmissions for one or more physical resource blocks of the 5G NR carrier are made with a first power level, and wherein transmissions on the paging alert channel are made with a second power level that is equal to or higher than the first power level.

In some implementations, the method includes identifying alert frames corresponding to an alert group that includes the communication device, wherein the identified alert frames are interspersed among other alert frames for other alert groups. Monitoring the paging alert channel comprises selectively or intermittently monitoring the paging alert channel to receive transmissions in the identified alert frames and to exclude receiving transmissions in alert frames for the other alert groups.

In some implementations, monitoring the paging alert channel comprises monitoring, by the communication device, the paging alert channel with discontinuous reception to receive transmitted signals in each of multiple alert frames that are spaced apart at an interval, each of the alert frames comprising a consecutive sequence of multiple frames.

In some implementations, the paging alert channel is a physical dedicated downlink channel in a predetermined resource block of a 5G NR carrier.

In some implementations, the paging alert signals on the paging alert channel are provided by a satellite access network.

In some implementations, the paging alert signals on the paging alert channel are provided by a base station of a cellular network.

In some implementations, the method includes determining the series of frames to monitor the paging alert channel based on an identifier for the device.

In some implementations, the method includes: receiving an alert master information block for a paging alert channel; extracting, from the alert master information block, a repetition control value that indicates a number of repetitions of paging alert signals that occur in each paging alert message; and determining the series of frames to monitor based on the identifier for the device and the repetition control value.

In some implementations, the method includes decoding the paging alert signals received during the series of frames.

In some implementations, the method includes extracting from the alert master information block an alert cycle duration that indicates a length of a paging alert cycle. Monitoring the paging alert channel comprises monitoring the paging alert channel repeatedly at an interval based on the alert cycle duration.

In some implementations, the method includes storing, by the communication device, data that specifies (i) multiple predetermined repetition control values that indicate different numbers of repetitions of paging alert signals in paging alert messages and (ii) paging alert timing properties for the respective repetition control values. Determining the series of frames to monitor comprises: identifying, from the stored data, the paging alert timing properties corresponding to the repetition control value that is indicated in the received alert master information block; and determining an offset that indicates a frame number indicating the series of frames, the offset being determined based on the identifier of the device and the identified paging alert timing properties.

In some implementations, determining that a synchronization signal is not received comprises determining, by the communication device, that the synchronization signal is not received for at least a predetermined minimum threshold number of consecutive paging occasions.

In some implementations, the method includes: determining that received paging alert signals transmitted during the series of frames include a paging alert message addressed to the communication device; and in response to determining that the received paging alert signals transmitted during the series of frames include the paging alert message addressed to the communication device, outputting a notification at the communication device, wherein the notification instructs moving the communication device to a location with increase signal quality.

In some implementations, the method includes: extracting an alert master information block for the paging alert channel; determining, based on the alert master information block, a number of repetitions of paging alert signals in each paging alert message; and determining whether signals received during the alert frame include an identifier for the communication device. Tuning the receiver of the communication device comprises tuning the receiver to receive signals during an alert frame having a duration that is based on the determined number of repetitions.

In some implementations, the method includes: in response to determining that signals received during the alert frame include an identifier for the communication device, outputting a notification at the communication device.

In some implementations, the notification instructs moving the communication device to a location with increased signal quality.

In some implementations, the method includes: extracting an alert master information block for the paging alert channel; and determining, based on the alert master information block, whether a value in a field of the alert master information block indicates that a short message or system information is available for the communication device.

In another general aspect, a communication device includes: a radio receiver; one or more processors; and one or more computer-readable media storing instructions that are operable, when executed by the one or more processors, to cause the communication device to perform operations of any of the methods.

In another general aspect, one or more non-transitory computer-readable media store instructions that are operable, when executed by one or more processors of a communication device, to cause the communication device to perform operations of any of the methods.

In another general aspect, a method performed by one or more communication devices includes: determining an end-of-coverage signal-to-noise ratio for a satellite beam; based on the determined signal signal-to-noise ratio, selecting a number of repetitions of paging alert messages for a paging alert channel for the satellite beam; transmitting an alert master information block that indicates the selected number of repetitions of paging alert messages; and transmitting paging alert messages for one or more communication devices on the paging alert channel, wherein the paging alert messages each include paging alert signals repeated the number of times indicated in the alert master information block.

Implementations of this and other aspects can include any of the following features, in any combination or subcombination.

In some implementations, the number of repetitions is a first number of repetitions. The method includes, after transmitting the paging alert messages: determining a second end-of-coverage signal to noise ratio for the satellite beam; based on the determined second signal signal-to-noise ratio, selecting a second number of repetitions of paging alert messages for the paging alert channel for the satellite beam, wherein the second number of repetitions is different from the first number of repetitions; transmitting a second alert master information block that indicates the selected second number of repetitions of paging alert messages; and transmitting second paging alert messages for one or more communication devices on the paging alert channel, wherein the second paging alert messages each include paging alert signals repeated the number of times indicated in the second alert master information block.

In some implementations, the second signal-to-noise ratio is higher than the first signal-to-noise ratio, and the second number of repetitions is lower than the first number of repetitions.

In some implementations, the second signal-to-noise ratio is lower than the first signal-to-noise ratio, and the second number of repetitions is higher than the first number of repetitions.

In some implementations, the method includes determining a signal-to-noise ratio for each of multiple satellite beams, and determining different numbers of repetitions for the paging alert channel for at least some of the multiple satellite beams, based on differences in the signal-to-noise ratios for each of respective satellite beams.

In another general aspect, a communication device comprises: a receiver configured to receive data transmitted on a 5G New Radio Non-Terrestrial Network (5G NR NTN) wireless communication channel, wherein the communication device is configured to receive 5G NR NTN paging signals and synchronization signals; wherein the communication device is configured to: determine when synchronization signals for the wireless communication channel are not detected; and in response to determining that the synchronization signals are not detected, monitor a predetermined paging alert channel designated for the wireless communication channel, wherein the predetermined paging alert channel is a predetermined resource block of a 5G NR NTN carrier.

In another general aspect, a method performed by one or more communication devices comprises: determining a number of repetitions for paging alert messages to be sent; determining an interval between paging alert messages; determining a system frame counter value; determining a hyperframe counter value; and providing an alert master information block for a paging alert channel that includes a value indicating the determined number of repetitions, a value indicating the interval between paging alert messages, at least a portion of the system frame counter value, and at least a portion of the hyperframe counter value.

In another general aspect, a method performed by one or more communication devices comprises: receiving an alert master information block for a paging alert channel; extracting, from the alert master information block, (i) repetition control bits that specify a number of repetitions of paging alert messages and (ii) a repetition interval that specifies an interval between paging alert messages; determining, based on the alert master information block, an initial frame in which to begin monitoring paging alert messages; and monitoring the paging alert channel to receive one or more paging alert messages, wherein the paging alert channel is monitored to (i) receive a paging alert message that begins at the determined initial frame and (ii) accumulate a number of repeated paging alert signals in the received paging alert message, wherein the number of repetitions of the paging alert signals is specified by the repetition control bits.

In some implementations, the method includes receiving multiple paging alert messages, each including multiple instances of the paging alert signals, that are spaced apart as specified by the repetition interval.

Other embodiments of these and other aspects described herein include corresponding systems, apparatus, and computer programs, configured to perform the actions of the methods, encoded on computer storage devices. A system of one or more computers and/or communication devices can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIG. 4 is a table of parameters for a paging alert channel.

FIG. 9 is an example of information in a master information block (MIB) for NB-IoT.

FIG. 10 shows information in an example of a alert channel master information block (AMIB) for the paging alert channel.

FIG. 11 shows information in another example of a master information block (AMIB) for the paging alert channel.

Like reference numbers and designations in the various drawings indicate like elements.

DETAILED DESCRIPTION

Figure 1:
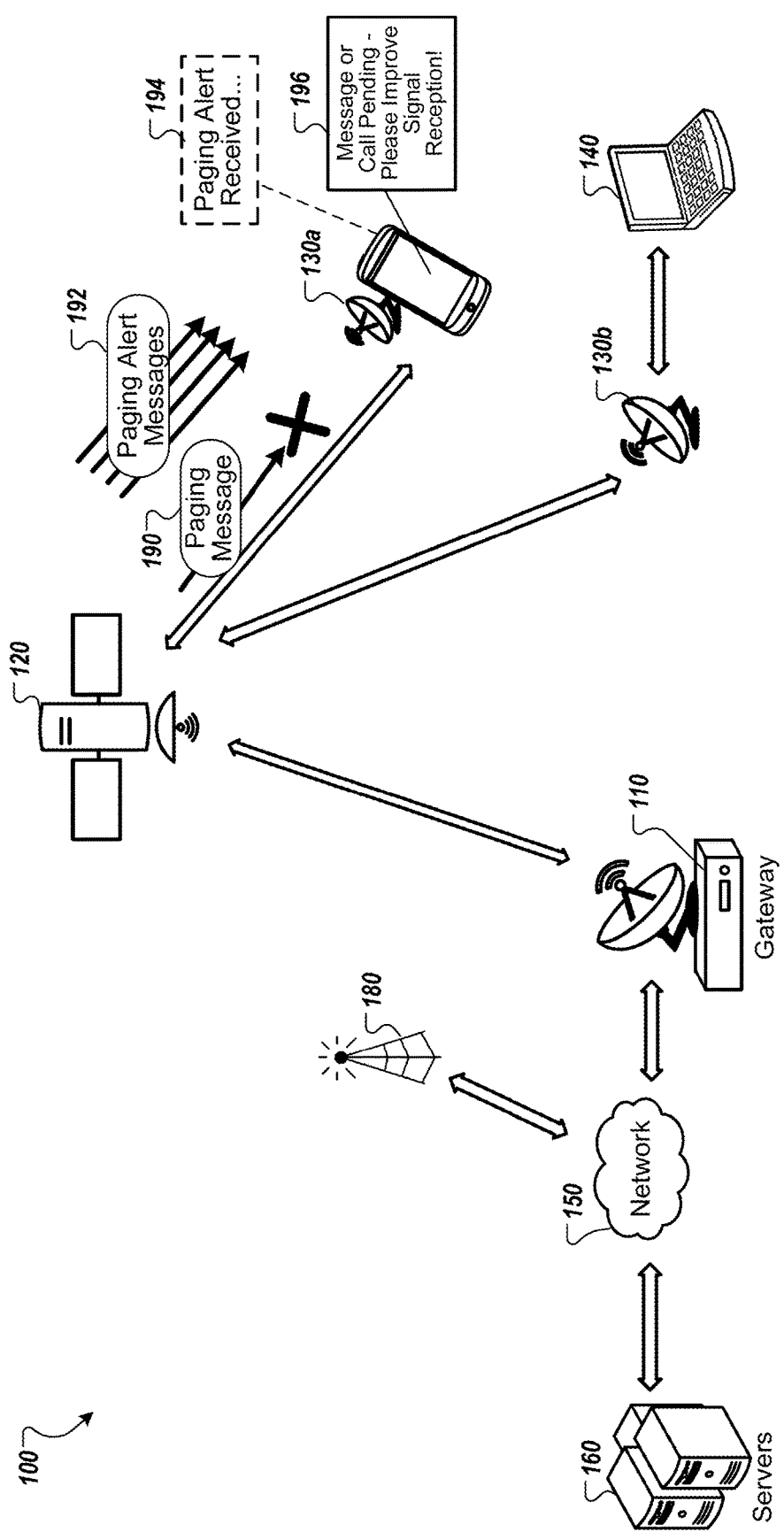
FIG. 1 is a diagram showing an example of a satellite communication system.

FIG. 1 is a diagram showing an example of a satellite communication system 100. The system includes a satellite gateway 110, a satellite 120, and UEs 130a, 130b. The system provides a satellite communication link with bidirectional communication. Through the satellite link, the UEs 130a, 130b can receive forward channel data, such as data that one or more servers 160 provide through a network 150, such as the Internet or a core network for telecommunications (e.g., a core network for 5G communications). The satellite link also enables the UEs 130a, 130b to send return channel data out through the network 150.

Various types of UEs can be used in the system 100, including very small aperture terminals (VSATs). For example, the UE 130a can be a mobile device, such as a satellite phone, a cellular phone, a handset, or other portable device that has a capability for sending and receiving signals over the satellite link. The UE 130b is an example of a terminal that provides network connectivity to another device 140, and so allows one or more other devices to access the network through the satellite link. In some implementations, the satellite communication link can be provided in addition to other radio access networks. For example, one or more terrestrial base stations 180 can provide cellular network connections at least in some geographic areas. The UEs 130a, 130b may be configured to be able to use cellular communication links with terrestrial base stations and/or satellite communication links to send and receive data, receive and interact in calls, and so on.

The system 100 can employ the satellite 120 and the satellite gateway 110 in a Radio Access Network (RAN) to provide network connectivity to the UEs 130a, 130b through the 3GPP 5G new radio (NR) non-terrestrial network (NTN) ("5GNR-NTN") framework.

In many cases, the current NG 5G RAN requires a reasonably high SNR for UEs to maintain a connection. In a satellite access network, there are power limitations that can often result in a low SNR for a UE. For a UE in NR NTN, it is possible that at times the UE may not be able to detect the synchronization signals when the UE is inside a building, pocket, or backpack or is otherwise obstructed. Even when there is still beam coverage (e.g., the UE is within the geographical area of the satellite beam providing connectivity), the UE may not be reachable by the NR NTN network due to additional path loss. If UE cannot receive the paging message, the core network and RAN may need to repeat the paging message, often many times, which will cause delayed paging message and wasted paging channel capacity.

In further detail, handsets and other UEs often use omnidirectional antennas which have much smaller gain than directional antennas. In Next Generation (NG) Non Terrestrial Network (NTN) communication, the link budget generally closes with very small margin for those handsets or UEs. When a UE is inside a user's pocket or backpack, or inside a building, the additional path loss may be so great that it causes the UE to be totally unreachable by the satellite access network. This very low signal strength would render the UE unable to receive paging messages that indicate an incoming call or message for the UE.

For example, when a UE is not actively using a network connection, the UE often operates in a Discontinuous Reception (DRX) mode or an extended Discontinuous Reception (eDRX). These modes alternate between sleep periods when the radio is turned off and periodic active modes when the radio is turned on to monitor for paging messages. When the UE is in the NTN coverage area but has very low SNR, when the UE turns on its radio to begin monitoring the paging channel for paging messages, the UE may not be able to detect the synchronization signals for the connection, e.g., the Synchronization Signal Block (SSB), Primary Synchronization Signal (PSS), and Secondary Synchronization Signal (SSS) of NG NR. The consequence is that if the RAN (e.g., the satellite access network) sends a paging message, the UE will not be able to receive the paging message and the RAN will repeat the paging message. This repetition will result in wasteful use of paging channel capacity that could have been used for paging messages for other UEs. In addition, poor signal strength at the UE may result in delayed receipt of the paging message, if it is ever received by the UE. In addition, a paging message for data transfer or messaging may get lost or received by the UE with a long delay.

FIG. 1 shows an example of a condition in which the UE 130a has low signal strength and cannot receive a paging message 190 sent by the core network through the satellite access network (e.g., via the satellite gateway 110 and the satellite 120). The core network may cause the paging message 190 to be sent repeatedly, but the low signal strength at the UE 130a prevents receipt of the paging message 190 each time.

To improve paging and connectivity, the system 100 provides an additional paging alert channel that can enable UEs to receive paging alerts even when signal strength is low. The paging alert channel can be a dedicated channel that periodically repeats alert messages according to a predetermined pattern, which can be configured by an operator of the system and can be changed as needed. When a UE detects that its signal strength is too low to receive standard paging messages, the UE can monitor the paging alert channel to receive paging alert messages. The UE can use the known characteristics of the pattern of alert messages to monitor the paging alert channel at the appropriate times to receive multiple transmissions of the paging alert messages, thus allowing the UE to accumulate signals over multiple transmission instances to enable reception of the paging alert messages. A paging alert message directed to a UE can signal that a paging message is available for the UE, and the UE in turn can inform the user to move to a location with better reception. Once the signal conditions have improved for the UE, the UE can start normal random access to respond to incoming calls or receive the paging message from the network.

The paging alert channel can provide several benefits to the system 100. For example, the paging alert channel helps to reduce paging delay experienced at UEs. UEs can be notified of a paging message even while they are experiencing poor signal conditions, allowing the user to improve signal conditions which expedites receipt of the paging message. In addition, the paging alert channel can improve paging channel efficiency in NR NTN system. After a few attempts at paging using the standard paging technique, the system can switch to using the paging alert channel. This reduces the number of futile paging attempts that are made using standard paging in an attempt to contact terminals that have SNR levels too low to allow reception, freeing up the standard paging opportunities for terminals that can receive them.

In the illustrated example, after a certain number of standard paging attempts (e.g., after a predetermined threshold is reached), the core network and RAN stop sending standard paging messages 190 and instead send paging alert messages 192 on the paging alert channel. The paging alert messages 192 are sent periodically with timing characteristics that are communicated to the UE 130a. The UE 130a determines that it cannot receive the synchronization signal for the satellite link, and so it begins to intermittently monitor the paging alert channel. The paging alert channel will provide synchronization-assisting information for UE 130a to recover frequency and timing synchronization. The UE 130a uses the system information carried in AMIB to derive the corresponding timing characteristics for the paging alert channel and hence determines the time slots or other time periods for paging alerts to the UE 130a. By monitoring the corresponding time periods and accumulating signals over multiple paging alert messages, the UE 130a is able to receive the paging alert message 192 at a much lower SNR than is required to receive a single transmission of the paging message 190. The UE 130a receives the paging alert message 192 (illustrated in block 194), and determines that the paging alert message 192 is intended for the UE 130a. In response, the UE 130a notifies the user, such as with an audible alert and/or message 196, to inform the user that there is a pending call or message and to request that the user move to a location with better signal strength. Once the signal characteristics for the UE 130a improve to the point that the UE 130a can receive the synchronization signals, the UE 130a connects to the RAN and the core network can cause the paging message 190 to be resent at time when the UE 130a has the ability to receive it.

Figure 2:
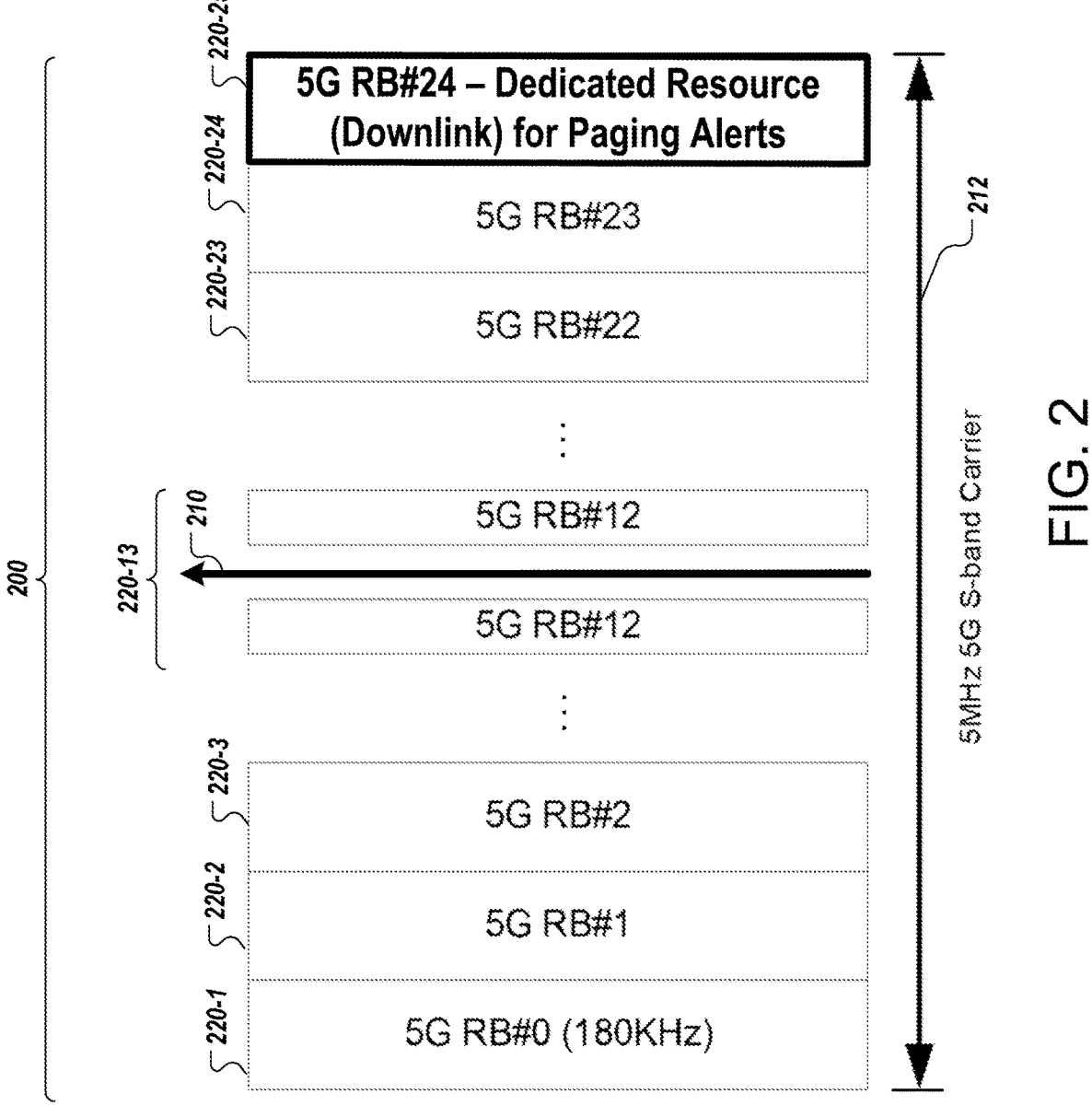
FIG. 2 is a diagram showing an example of a carrier and associated resource blocks.

FIG. 2 is a diagram showing an example of a carrier 212 and associated resource blocks 220-1 to 220-25. In 5G communications, orthogonal frequency-division multiplexing (OFDM) is used so that a signal has a carrier and multiple sub-carriers. The present technique can dedicate one of the sub-carriers for enhanced paging. In particular, the dedicated sub-carrier can be used to provide a "paging alert," a low-bandwidth signal that can indicate when the network has a page pending for the UE.

In 5G communications, a carrier or channel can have a width of 5 MHz. Within a 5 MHz carrier or channel, there are 25 Resource Blocks (RB), and each RB occupies 180 KHz, and there are 12 subcarriers within each RB with 15 KHz subcarrier spacing. In order to avoid UEs missing the important paging messages for calls or short messages when in RRC Idle or inactive mode, the system can allocate one Resource Block (RB) of 180 kHz (e.g., including 12 subcarriers) as a dedicated Physical Downlink Paging Alert Channel (PDACH) (also referred to as the "paging alert channel" or "alert channel"). The paging alert channel enables gNBs to send a paging alert message to signal that a paging message was sent, e.g., that a paging message is pending or was sent and not acknowledged. A paging alert message addressed to a UE can represent a request for the user to move to a location with better signal reception, so the UE can respond to the Radio Resource Control (RRC)

paging by starting a random access procedure for RRC paging or decode System Information Blocks (SIBs) for short message paging.

In the example of FIG. 2, the paging alert channel is designated for RB #24 (220-25). As illustrated, the alert channel can be positioned at the edge of the carrier 212, such as the resource block at the beginning or end of the series (e.g., at the boundary of the bandwidth designated for the carrier 212 and not in designated guide space or open space). In some implementations, the power level of the alert channel can be equal to the power used for the rest of the RBs. In other implementations, the power level of the alert channel can be different from (e.g., several dB higher than) the power used for the rest of the RBs, which can help to achieve reliable paging alert messaging with an even lower SNR for the PDACH with the same number of repetitions or can maintain reliable paging alert messaging with the same lower SNR for the PDACH with reduced number of repetitions.

The paging alert channel or PDACH is used for downlink communication only. The PDACH is self-sufficient with built-in synchronization signaling. It helps the UE maintain synchronization with the network, which can speed up re-acquisition of the UE when it is moved to a better reception location. By repeating the transmissions of the alert signal (e.g., with multiple repetitions in each burst or alert message), the effective SNR of the accumulated signals is increased for the receiver. Doubling the number of transmissions adds at most 3 dB of effective SNR for the receiver. In some implementations, the paging alert signals can be transmitted with increased power, which can help to minimize the number of repetitions needed to receive the paging alert. In 5G communications, two types of paging are used, one for a call received, and another for short messages, such as for public safety or system information modification. Each of these can have a separate procedure for paging alerts on the paging alert channel.

Because each paging alert involves multiple repeated transmissions, using the paging alert consumes significant bandwidth and power resources. As a result, in some implementations, the paging alert channel is only used to communicate with a UE when the typical paging process is not successful. For example, after the network attempts to page a UE, if the paging signal is not acknowledged by the UE, the network will repeat the standard paging process for a predetermined number of times as configured by an operator of the system. If the paging is still not received and acknowledged by the UE, then the network will start sending a paging alert for the UE on the paging alert channel. Each paging alert involves sending a paging alert signal repeatedly, with timing properties that the network and the UE can each determine independently.

When the UE determines that it does not have sufficient SNR or connectivity, the UE will also independently determine to tune itself to receive paging alert signals in the timing windows designated for it. The timing windows, referred to below as alert frames, each represent the duration of one paging alert message. Each alert frame can be shared by a group of multiple UEs, so that the multiple UEs in the group concurrently monitor the same alert frame. The alert frames are organized in a known pattern so the UE can determine the appropriate alert frames to monitor. For example, based on system information provided in the AMIB, each UE can select appropriate alert frames to monitor, such as alert frames occurring at a particular timing offset from a reference.

When a UE receives a paging alert message in its alert frame, the UE can perform time integration of the paging alert signals in the paging alert message to accumulate samples over time and combine them, so the UE obtains enough signal to decode the paging alert signal properly. The content of the paging alert signal can indicate to the UE if, in fact, that particular UE is being paged. For example, the repeated paging alert signal can include an identifier for the UE being paged, and any UEs receiving the paging alert message can compare to their own identifiers to determine if the paging alert message is intended for them.

Figure 3:
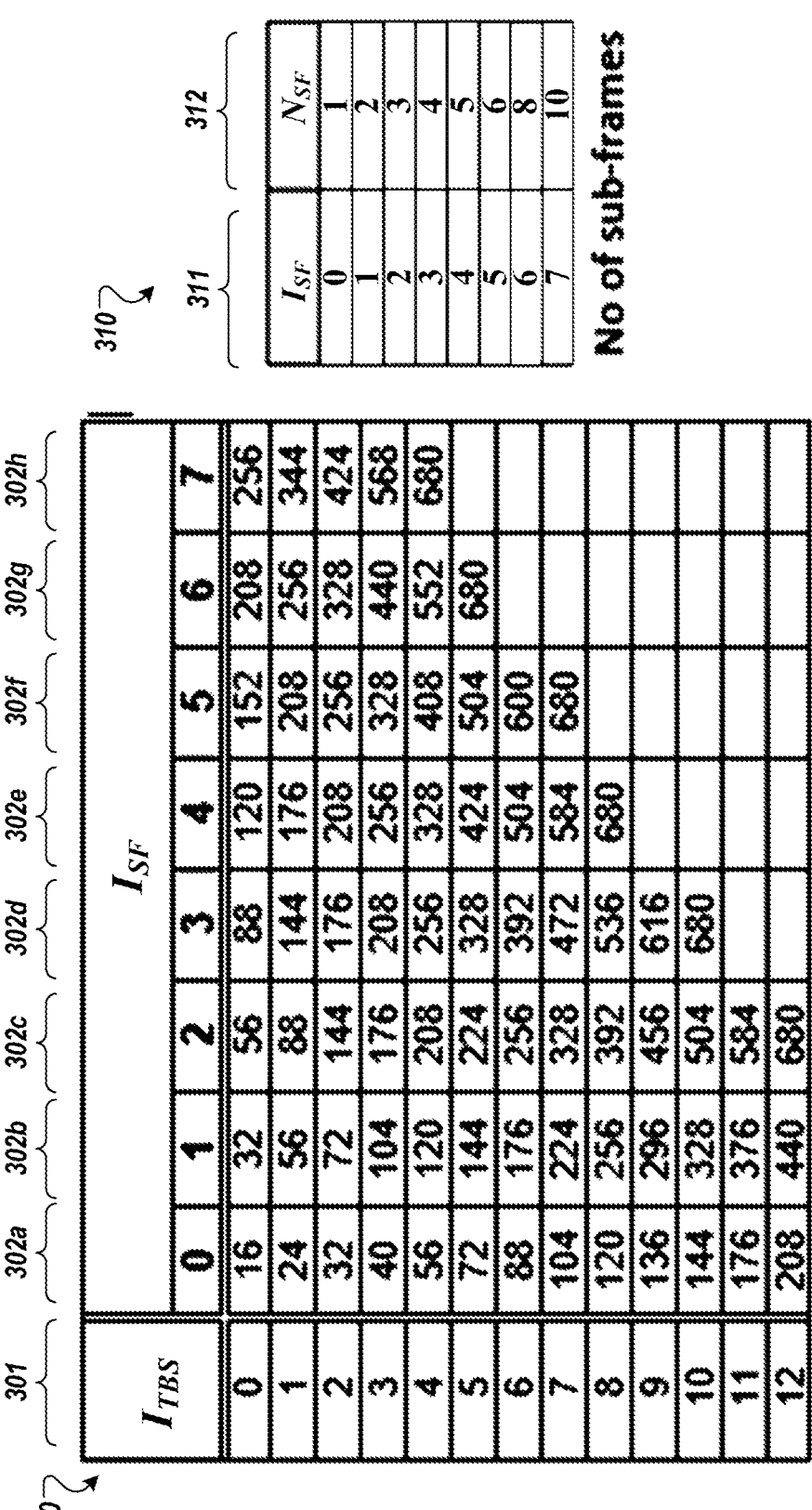
FIG. 3 is a diagram showing a table of transport block size values and a table of subframes.

FIG. 3 is a diagram showing a table 300 of transport block size (TBS) values and a table 310 of subframes. The tables 300, 310 can be used to determine the data throughput for the paging alert channel when a particular UE is being paged. For example, the paging alert messages for RRC setup, RRC request, or RRC resumption can be encoded and modulated based on the Narrow Band Physical Downlink Shared Channel (NPDSCH) for NB-IOT, which carry user data. The alert messages can be generated using a tail bite convolutional code.

In the table 300, the left-hand column 301 provides values for a transport block size index, $I_{TBS}$, which represent different code rates that may be used. The other columns 302a-320h in the table 300 respectively represent different values for an index for a sub-frame index, $I_{SF}$, which represent different amounts of resource assignment, in sub-frames. For example, the column 302a includes transport block sizes different code rates for a sub-frame index, $I_{SF}$, with a value of "0;" the column 302b includes transport block sizes (TBS) for different code rates for a sub-frame index, $I_{SF}$, with a value of "1;" the column 302v includes transport block sizes for different code rates for a sub-frame index, $I_{SF}$, with a value of "2;" and so on. For example, based on column 302a, code rate of $I_{TBS}$=0 and resource allocation of $I_{SF}$=0 has a TBS of 16 bits; code rate of $I_{TBS}$=1 and resource allocation of $I_{SF}$=0 has a TBS of 24 bits; and so on. Based on column 302b, code rate of $I_{TBS}$=0 and resource allocation of $I_{SF}$=1 has a TBS of 32 bits; code rate of $I_{TBS}$=1 and resource allocation of $I_{SF}$=1 has a TBS of 56 bits; and so on.

The table 320 provides a mapping between the values of the sub-frame index, $I_{SF}$, in column 311 to numbers of sub-frames, $N_{SF}$, in column 312. For example, a sub-frame index $I_{SF}$=0 leads to a number of sub-frames $N_{SF}$=1 sub-frame; a sub-frame index $I_{SF}$=1 leads to a number of sub-frames $N_{SF}$=2 sub-frames; and so on.

The example of FIG. 3 shows how data can be encoded for paging alerts and an example of throughput that can be achieved. The amount of data needed to transmit a paging alert is based on (i) the size of a UE identifier (e.g., a maximum of 48 bits) and an (ii) amount of bits needed for forward error correction. For example, the transport block size (TBS) can be the sum of 48 bits for the UE identifier plus 24 bits for cyclic redundancy check (CRC), resulting in a total of 72 bits of TBS for each transmission of a paging alert message. The system can use the lowest code rate from the table 300 that efficiently provides the needed 72-bit throughput (e.g., without wasted space beyond the 72 bits desired). For example, the desired 72-bit TBS can be found for a value of $I_{TBS}$=2 and a value of $I_{SF}$=1. Using the table 310, the value of $I_{SF}$=1 maps to an $N_{SF}$=2, which indicates that two sub-frames are needed for the selected code rate ($I_{TBS}$=2) and TBS size of 72 bits.

Further calculations indicate properties that would result from repetition of paging alert messages and resulting timing with respect to frame boundaries. For example, given 152 symbols per sub-frame and two sub-frames per paging alert message, transmitting a paging alert message with a length of 2 sub-frames involves 152*2=304 symbols. Assuming 2 bits per symbol, the resulting code rate is 72 bits/(304 symbols*2 bits/symbol)=0.1184 code rate. The SNR in the example will be at about −5 dB to achieve a 1e-3 PER (packet error rate). Nevertheless, repeating the paging alert message 128 times will add an additional 21 dB gain for the receiver.

Continuing the example, given a duration of 1 millisecond (ms) per sub-frame, the final transmission duration of the paging alert message burst will be 2 sub-frames times 128 repetitions, or 2*128=256 ms=256 sub-frames. When accounting for the overhead of the NBPCH, Narrow Band Primary Synchronization Symbol (NPSS), and Narrow Band Secondary Synchronization Signal (NSSS), the actual duration of a paging alert burst in the alert channel is 256/0.75=341.333. Using a fractional number of sub-frames will not align with the frame boundaries, however, which can cause complications for scheduling. As discussed below, the paging alerts can be organized to align with boundaries of frames and/or hyperframes, which can improve scheduling and synchronization. For example, the parameters for the paging alert messages can be set so that bursts or sequences align with frame boundaries. In this example, throughput achieved is 48 bits/256 ms*75%=140.625 bps.

FIG. 4 is a table 400 of parameters for a paging alert channel. The table 400 shows an example how the system can make available different amounts of repetition for paging alert messages, and thus provide different effective amounts of gain for UEs. The table 400 shows four different options, with each of four columns 410a-410d representing characteristics of a different amount of repetitions. In the example, there is first option with a base or reference amount of repetitions, and the others are a multiple of the base amount. In particular, each option doubles the number of repetitions of the option before, which makes a wide range of potential increases in signal gain available in the system. In the example, each of the selectable, predetermined options defined for the number of repetitions is a multiple of 30. As will be discussed further below, with the other properties discussed in the example above (e.g., 72 bits per alert message, 2 sub-frames per alert instance, overhead adding an additional 33%, etc.), this results in timing properties that ensure that the TTI of the alert message sequence is in integer number of frames for simple scheduling. Any of the selectable, predetermined options in the system for the number will thus align with frame boundaries.

The paging alert channel only includes communication on the broadcast channel (NPBCH) and shared channel (NPDSCH). The AMIB is carried by the NPBCH. In other words, the operation of the paging alert channel can occur without any control channel communications to reduce complexity as well as improve efficiency.

In the table 400, the row for the repetition control bits indicates the 2-bit codes that can select the different options for the number of repetitions. The repetition control bits for the selected option can be transmitted to UEs in the NB-IOT broadcast alike channel. For example, the selected value of the repetition control bits can be included in the Alert Master Information Block (AMIB) to specify one of the four different numbers of repetitions. For example, the value "00" can indicate that the paging alert message sequence includes 30 repetitions. The values "01," "10," and "11" can respectively indicate that paging alert message sequences include 60, 120, or 240 messages. The row for the repetition number indicates the number of repetitions that occur in a paging alert. The paging alert content (e.g., the UE identifier for a UE to be alerted of a pending page for an incoming call) would be encoded and modulated into a series of symbols. The series of the modulated symbol of the paging alert content forms one paging alert signal and it would be repeated multiple times to form one paging alert message. In other words, for column 410a, the paging alert signal would be repeated 30 times for each paging alert message.

The other rows in the table 400 indicate other properties of the paging alerts. For example, the burst duration indicates the duration of a paging alert burst in milliseconds, e.g., 60 ms for 30 repetitions, 120 ms for 60 repetitions, etc. Similarly, a column indicates burst duration with overhead of 33%, so that total burst duration would be 80 ms for 30 repetitions, 160 ms for 60 repetitions, etc. The repetition gain for each option is also listed, showing that the gain in dB ranges from 14.77 for 30 repetitions to 23.80 for 240 repetitions.

By selecting from among the different options, the system can manage the tradeoff between increase in gain and capacity of the system. For example, increasing the number of repetitions increases the effective gain at the UE, but the increased transmission duration of a longer burst decreases the number of paging messages that can be provided in a given amount of time, which will result in reduced paging alert capacity. For example, the effective throughput (condensing each series of repetitions to its single message content) is 600 bps for 30 repetitions but decreases to 75 bps for 240 repetitions. In addition, the number of frames per paging alert message (FNPPM) increases from 8 frames for 30 repetitions to 64 frames for 240 repetitions. In an arrangement where there are 1024 frames for one alert cycle, there can be 128 paging alerts per alert cycle (PAPAC) or 128 paging alert frames for 30 repetitions and only 16 PAPAC or 16 paging alert frames for 240 repetitions in one alert cycle. Each paging alert frame duration corresponds to one paging alert message duration. UEs will be grouped into PAPAC groups, or alert groups, within one alert cycle to share the same alert frame. The system operator will choose the alert cycle duration according to the desired system alert capacity per beam.

The alert channel is configured for downlink communication only and there is no need for acknowledgement, and so there is no power measurement feedback and the number of repetitions is not optimized per UE. However, the number of repetitions used for each paging alert sent can be adjusted and set differently for different spot beams of a satellite. For example, the paging alert channel repetition number can be different for different beams, because different beams may have different worst-case SNR at their beam edges, e.g., due to equipment manufacturing and system implementation choices, and the system may be able to achieve the same alert channel minimum SNR with different numbers of repetition for different beams. For example, a minimum effective SNR can be set, and for a first beam that minimum level may be achieved with 30 repetitions, while for a second beam of the satellite the 60 repetitions may be needed to reach the minimum. Accordingly, the system operator can set different repetition numbers for the different beams, and the system can indicate to the various UEs the selected repetition numbers for their respective beams. The value of the repetition number that is selected for each beam can be initialized in the NPBCH of the beam.

To facilitate paging alerts, the information in the alert master information block (AMIB) can be modified to include the parameters for paging alerts. For example, the AMIB information can be simplified to allow the receiver to be as simple as possible.

Figure 5:
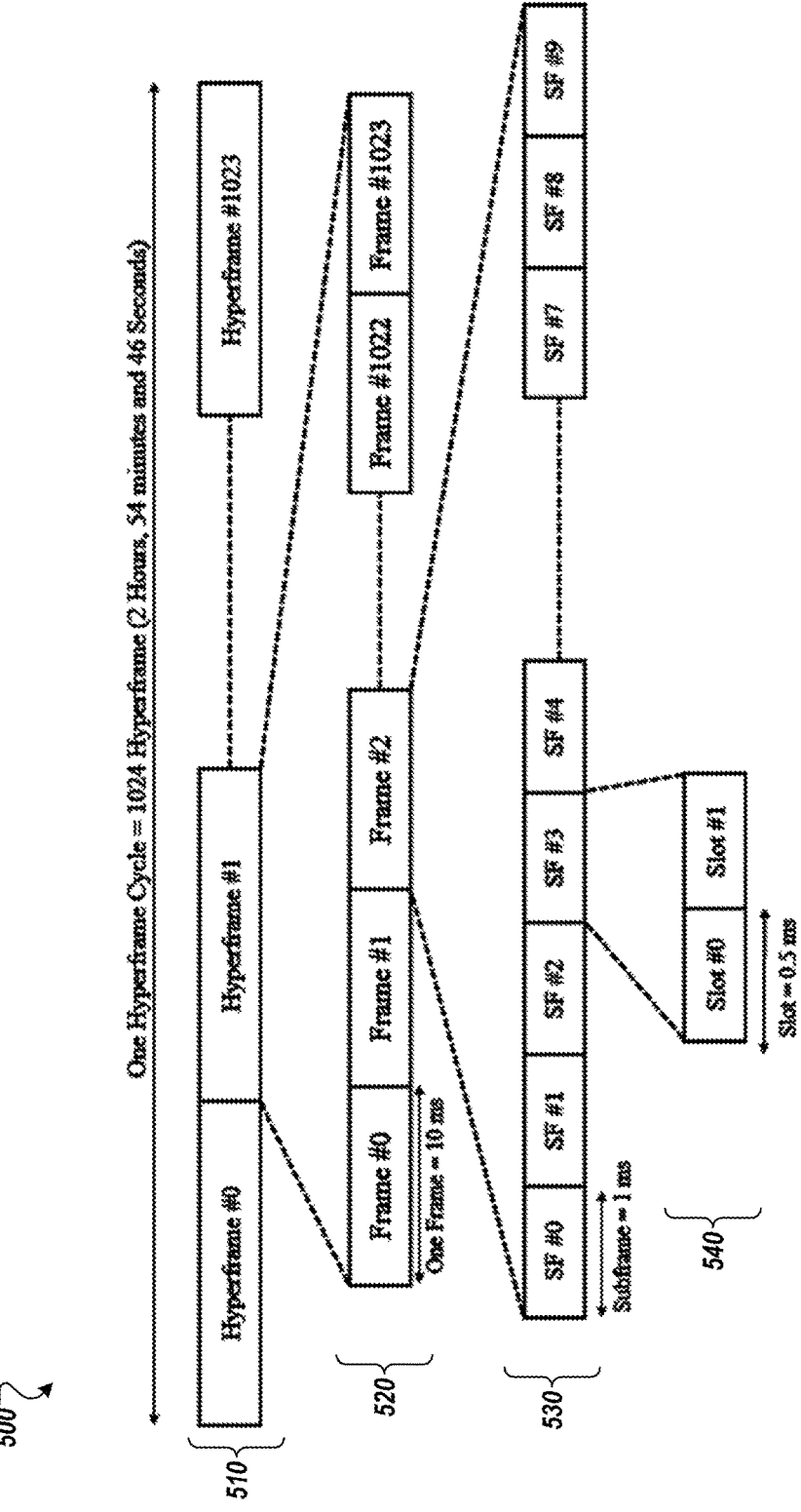
FIG. 5 is a diagram showing an example frame structure for wireless communication.

FIG. 5 is a diagram showing an example frame structure 500 for wireless communication. The example includes multiple divisions of time at different levels, including, from longest duration to smallest duration, hyperframes 510, frames 520, sub-frames 530, and slots 540. The frame structure used can be the NB-IOT frame structure, used for 15 kHz subcarrier spacing, but other frame structures can also be additionally or alternatively used.

In the example, each frame 520 has a duration of 10 ms, and each frame 520 has an associated 10-bit frame number that is assigned sequentially, for a total of 1024 frames before the frame numbers restart. A collection of 1024 frames 520 is defined as a hyperframe 510. The hyperframes 510 also have hyperframe numbers assigned, and use a 10-bit hyperframe number. A sequence of 1024 hyperframes 510 forms a hyperframe cycle.

Each frame 520 is also divided into 10 sub-frames 530, and each sub-frame 530 has a duration of 1 ms. Each sub-frame 530 is divided into two slots 540, each having a duration of 0.5 ms.

Figure 6:
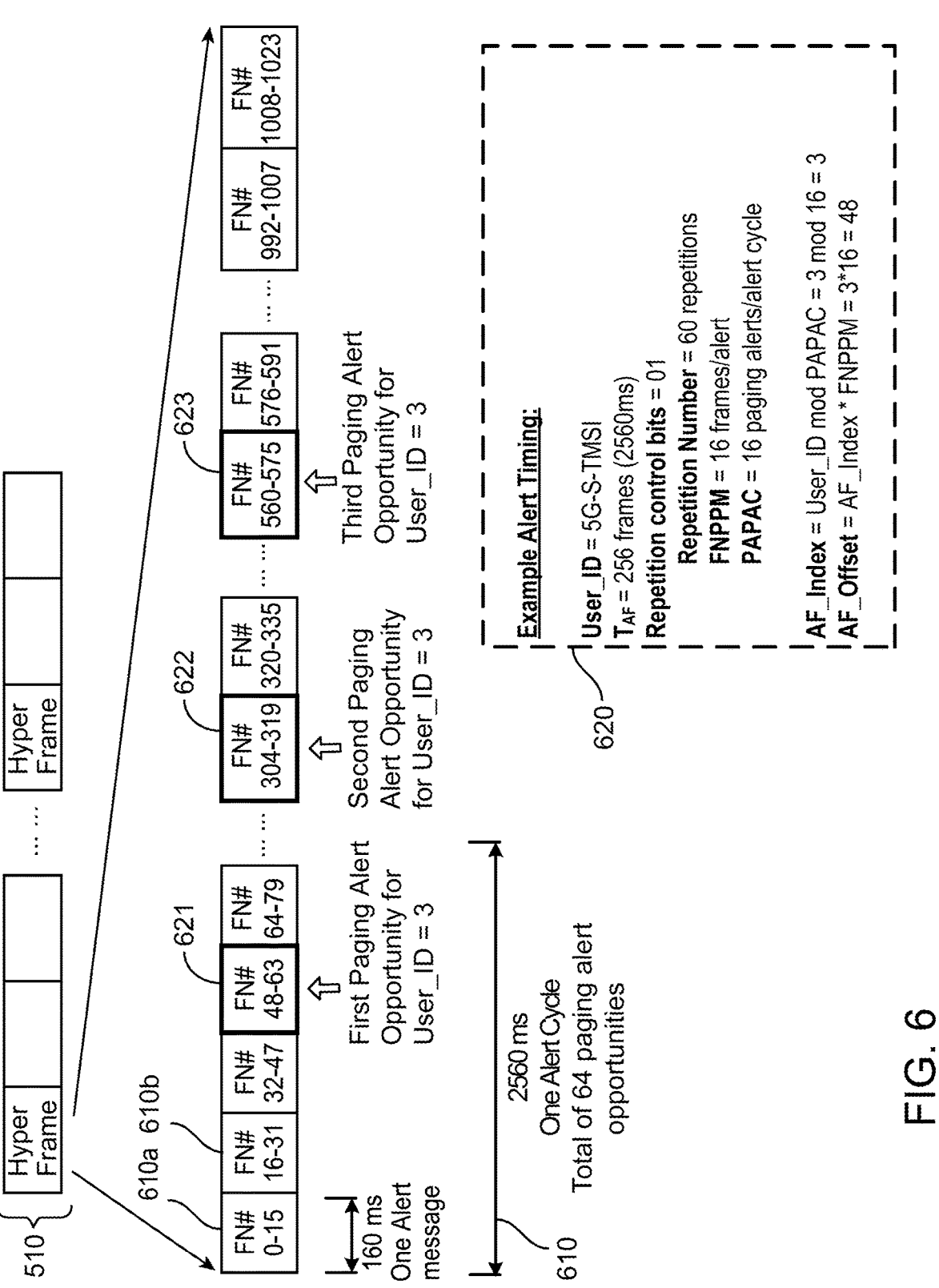
FIG. 6 is a diagram showing an example of a series of paging alert messages in a wireless communication frame structure.

FIG. 6 is a diagram showing an example of a series of paging alert messages in a wireless communication hyperframe. The example represents operation in a mode where the alert cycle includes 256 frames which corresponds to 2560 ms, each paging alert burst (e.g., a paging alert message) includes 60 repetitions, with each paging alert burst spanning 160 ms. This results in 16 paging alert opportunities (e.g., 16 alert frames) in one alert cycle of 2560 ms, or a total of 64 paging alert opportunities in each hyperframe 510.

In some cases, one paging alert cycle is longer than a hyperframe, so the alert cycle can span or cross hyperframe boundaries.

The system assigns UEs to monitor the paging alert channel at different time windows, which are referred to as alert frames 610. Each alert frame 610 represents a single burst having the number of repetitions selected for the beam. In this example, each alert frame 610 represents the duration of 60 repetitions of paging alert signals. Groups of UEs, e.g., alert groups, can be assigned different alert frames 610. For example, one alert frame 610a (including frames numbered 0 to 15) can be designated for a first group of multiple UEs, another alert frame 610b (including frames numbered 16 to 31) can be designated for a second group of multiple UEs, and so on. The alert frames 610 can be designated so that UEs and the core network can deterministically calculate the windows to which any given UE is assigned, allowing the UE to monitor at the times when the system would provide a paging alert for that UE. Rather than manually allocating each UE to corresponding alert frames 610, the system uses predetermined functions or rules so that, for each UE, the UE and the core network can each separately determine which alert frames 610 should be used to send a paging alert message for the UE.

Various timing and tracking parameters are used to coordinate messaging. The System Frame Number (SFN) serves as timing unit to count frames. The system frame number is a 10-bit value, with a value between 0 and 1023. Each frame has a duration of 10 ms, and each frame will have 10 sub-frames, where each sub-frame duration is 1 ms. The longest time span for the timing synchronization without resetting to 0 is 1023 SFN. The maximum duration of a frame counting cycle is 1024×10 ms, which is 10240 ms (=10240 sub-frames=10.24 sec). Most of the timing related parameters (e.g., Idle mode DRX, Connected Mode DRX, BSR Report period, etc.) are configured within this maximum timing value for the SFN.

A hyperframe number serves as extended timing unit, so that timing can be tracked beyond the maximum value of the system frame number. For example, each time the system frame number rolls over (e.g., returns to 0 after counting up to 1023) the hyperframe number is incremented. The hyperframe number has a value from 0 and 1023, each hyperframe comprises 1024 frames, as shown in FIG. 5.

Additional timing parameters can also be used to facilitate the paging alert system, including an alert frame offset and an alert cycle value. The alert frame offset has a number between 0 to 1023. Each paging alert message sequence will span multiple frames when the repetitions are taken into account. The alert frame offset is the frame number of the beginning of the sequence of messages. For example, an alert frame offset value of 23 indicates that, for the corresponding UE(s) the sequence or stream of alert messages begins at a system frame number of 23. The alert frame offset helps synchronize the network and each individual UE about where a paging alert frame begins (e.g., a series of frames designated for a UE to listen for paging alerts) with respect to the system frame count. The frame numbers which carry the system timing information will be broadcast in the NPBCH to all the UEs. The system timing information broadcast in the NPBCH is specified by system frame number, which is defined in the AMIB. Each UE decodes the AMIB to extract the system frame number to get synchronized to the network, so the UE can wake up at the appropriate time to check if there are alert messages for the UE in the appropriate alert frames.

Each UE may have an alert frame offset value that is derived from the UE's identifier in the system. The alert frame offset can be calculated from UE identifiers using a deterministic process known to both the network and each UE. As a result, the network and the UE can each independently calculate the same alert frame offset to use, so the network transmits paging alert messages in the alert frame 610 when the UE is listening for paging alert messages. The alert frame offsets are not required to be unique to a UE. Instead, multiple UEs can share the same alert frame offset. Nevertheless, the algorithm for deriving the alert frame offset can distribute the various UEs among different alert frame offsets based on their identifiers, so that generally only a relatively small group of UEs share the same alert frame offset.

In addition, an alert cycle parameter value indicates how often the UE should wake up to check for paging alert messages on the PDACH. The alert cycle parameter represents a quantity of frames, with a maximum value of 16384. To account for longer duration than the system frame number allows, the four 4 least-significant bits (LSBs) of the Hyperframe Number can be combined with the 10-bit System Frame Number, to allow cycles to be defined for up to a maximum of 163.84 seconds. In general, the longer the alert cycle and the smaller the repetition number, the larger the alert channel capacity will be.

As noted above, the alert frame offset values can be calculated separately by the network and the UEs using a deterministic process based on the UE's identifier. The UE needs to wake up at correct time to listen on the PDACH, and the network needs to transmit at the correct time on the PDACH for the UEs that need paging alerts. Multiple UEs can share the same alert frame offset, but at any given time only 1 paging alert is provided (designated for a single UE), and it is provided at a time in the alert frame cycle that is specified by that alert frame offset. Once a UE wakes up and listens to the PDACH at the designated frame offset, the UE determines whether the received identifier from the PDACH matches the UE's own identifier. If not, the UE can determine that the paging alert is not for it and can return to a low power state until the next cycle time when the PDACH is checked again at the appropriate alert frame offset. Each UE will wake up to listen at its corresponding alert frame offset, which is a specific value of the system frame number. For example, this may involve a UE waking up once every 10 seconds to check the PDACH when connectivity is very weak.

In some implementations, to calculate the alert frame offset for a terminal, the least significant 10 bits of the UE's identifier is used. As a result, each time the system frame number equals the 10-bit least-significant portion of the UE's identifier, the UE will check the PDACH again. The PDACH can use a fixed payload duration of fixed payload, such as a payload of 72 bits (e.g., a 48-bit device ID or user ID+24-bit CRC). Because listening on the PDACH consumes power and uses radio resources, the UEs can each be configured to listens on the PDACH only when the signal on the main paging channel is too low to be effective, such as when the signal level is below a minimum threshold needed for proper reception.

As an example, the UE identifier used for determining the appropriate alert frame for the UE can be the 5G S-Temporary Mobile Subscriber Identity (5G-S-TMSI) or the 5G Globally Unique Temporary Identifier (5G-GUTI). The 5G-S-TMSI is typically a shortened version of the 5G-GUTI. An identifier can be derived from the 5G identifier with a modulo function using the number of frames per hyper frame, e.g., User_ID=mod(5G-S-TMSI, 1024). The User_ID value can be used to generate other values for the managing the alert timing.

The system also sets an alert cycle duration, $T_{AF}$, expressed as an amount of frames. The value of this parameter is required to be a multiple of the number of frames per paging message (FNPPM), so that the alert cycle includes an integer number of paging alerts. For example, if each paging alert spans 16 frames (e.g., to provide 60 repetitions of the paging alert data), then the alert cycle duration will be a multiple of 16. The alert cycle duration can be longer than one hyperframe. For better paging capacity, it is often preferable for the duration to be long enough to enable a user to notice the paging alert notification from the UE and have time to move to a location with better reception, to avoid the need to use capacity on the alert channel with a second or subsequent alert message. The alert cycle duration, $T_{AF}$, can be specified in the Narrowband Physical Broadcast Channel (NPBCH) that provides the Alert Master Information Block (AMIB). There is no additional Control channel used for paging alerts, which reduces overhead and simplifies control of the alert channel. Control information is included in AMIB which will be broadcast to all UEs in the NPBCH.

For each UE, two parameters can be calculated to indicate when an alert message would be provided: an alert frame index and an alert frame offset. Both the alert frame index and an alert frame offset can vary based on the number of repetitions selected to be used in the satellite beam. The core network and each UE can store a table, such as table 400 of FIG. 4, that indicates the meaning of the repetition control bits and other related properties of each repetition option, such as the number of frames per paging message (FNPPM) and the number of paging alerts per alert cycle (PAPAC). The UE can can look up these properties based on the repetition control bits received.

The alert frame index, AFindex, can be determined as User_ID mod PAPAC, where PAPAC is the number of paging alerts per Alert Cycle. The alert frame index specifies which alert frame, in a sequence of alert frames that form the alert cycle, the UE should monitor. In effect, the alert frame index assigns the UE to one alert group, out of a total number of alert groups of UEs equal to the PAPAC, that will all share a same alert frame for receiving paging alert messages. Because most of the UEs are not paged most of the time, a variety of UEs can share the same alert frames to monitor for alert messages. Nevertheless, the calculation of the alert frame index based on the modulo function and PAPAC distributes the user identifiers among the possible alert groups to limit the likelihood or extent of conflicts or delays in sending paging alert messages.

The alert frame offset, AFoffset, can be determined as the alert frame index value multiplied by the number of frames per paging alert message, or AFindex*FNPPM. The alert frame offset, AFoffset, indicates the frame number that begins the alert frame that the system would use to send a paging alert message to the UE.

A UE can begin monitoring the paging alert channel at the frame number indicated by the calculated alert frame offset, AFoffset. The UE can continue to periodically monitor alert frames at an interval to monitor additional paging alert opportunities. In other words, the alert frame index, AFindex, indicates the alert frame within the alert frame cycle that should be monitored, and that same time window position should be monitored in subsequent alert frame cycles. Similarly, the alert frame offset, AFoffset, indicates the frame number that begins the paging alert opportunity (in this case, an alert cycle begins at the beginning of a hyperframe). The same frame offset also indicates the position of paging alert opportunities for subsequent alert cycles, and the UE and the network can identify these using the alert cycle duration, $T_{AF}$ (e.g., the number of frames in the alert cycle). For example, after the first paging alert opportunity at a frame number indicated by the alert frame offset, AFoffset, a second paging alert opportunity can be at the frame number given by the sum of the AFoffset and $T_{AF}$, a third paging alert opportunity can be at the frame number given by the sum of AFoffset and $2*T_{AF}$, and so on.

The alert cycles may not align with hyperframe boundaries, and indeed it may be preferable for an alert cycle to be longer than a hyperframe boundary to increase the spacing between subsequent repetitions of paging signals. Similarly, a long alert cycle may be beneficial to provide a greater number of alert frames per alert cycle and thus have fewer UEs assigned for each alert frame. The timing measures used can go beyond the 10-bit system frame number (SFN) and also take into account at least some of bits of the hyperframe number (HN). For example, for purposes of assigning and tracking alert frames and alert cycles, both the core network and the UEs can use the system frame number together with the four least-significant bits (LSBs) of the hyperframe number, combined as a 14-bit counter for frames (e.g., the 4 LSBs of the HN can be appended to be the four most-significant bits (MSBs) of the counter, which can represent an extended frame number). As a result, the alert frame offset can indicate the number of frames following the reference position of zero for the SFN and also zero for the four LSBs of the HN.

FIG. 6 also shows an example 620 of calculating the paging alert windows or paging alert frames for a UE. In the example 620, the User_ID is 3. The system specifies that the alert cycle duration, $T_{AF}$, is 256 frames (e.g., 2560 ms). The control information in the network provides repetition control bits of "01," which the UE can determine from a stored table represents 60 repetitions of the alert data in each paging alert message. From the same table the UE can determine that for this amount of repetitions the number of frames per paging alert message (FNPPM) is 16, and the number of paging alerts per alert cycle (PAPAC) is $T_{AF}/$ FNPPM=156/16=16. With these values, the UE can calculate the alert frame index, AFindex, as User_ID mod PAPAC=3 mod 16=3. The UE can also calculate the AFoffset as AFindex*FNPPM=3*16=48.

Based on these calculations, the UE with User_ID=3 will wake up from sleep mode to monitor the alert frame 621 that begins with a frame number of 48, since the AFoffset value is 48 within one alert cycle. The UE applies the frame offset from the reference position, which can be a value of zero for the 14-bit extended frame counter value that includes the 10-bit system frame number and the 4 LSBs of the hyperframe number. The monitored alert frame 621 is the fourth alert frame in the alert cycle, indicated by the alert frame index providing an index of 3 (e.g., the first alert frame has an index of 0, the second alert frame has an index of 1, and so on).

After monitoring the alert frame 621, the UE again returns to a sleep mode with its radio off, until the next paging alert opportunity corresponding to the UE. There is one alert frame for the UE in each alert cycle, and the appropriate alert frame will begin with the same offset, Afoffset, from the beginning of each alert cycle. The UE calculates the next alert frame 622 to monitor as the Afoffset+$T_{AF}$, which results in a frame number of 48+256=304. The UE wakes up at the frame number of 304 to monitor the paging alert channel starting at a value of 304 for the 14-bit extended frame counter, which is shown as alert frame 622. After monitoring this paging alert window, the UE returns to sleep until it wakes to monitor the next alert frame 623, which the UE determines has a starting frame number of Afoffset+2 $T_{AF}$=48+2*256=560. The UE continues to intermittently monitor paging alert frames until the maximum frame number for the 14-bit extended frame counter, e.g., a value 16383, is reached and frame counting (using the extended 14-bit count) loops back to begin at the reference position of zero.

The arrangement discussed for FIG. 6 results in some new control information being needed, and this information can be provided in the alert master information block (AMIB) for the alert channel. These parameters and the AMIB are discussed further below with respect to FIGS. 9-11. For example, 4 LSBs of the Hyperframe Number are used instead of 2 LSBs, which will be combined with the 10-bit System Frame Number to cover a longer time duration. The repetition control bits, discussed above, define the number of repetitions and consequently the number of paging alert messages per alert cycle. The number of repetitions used can be set separately for individual satellite beams to better target the effectiveness of the PDACH for different levels of SNR. The alert cycle duration control bits define the number of frames per alert cycle, which defines how often each UE wakes up to monitor the alert channel. The system can also specify the number of failed standard paging opportunities in total before a UE decides to switch to monitoring the PDACH.

For Short Message Paging alert notification, a value can be defined in AMIB to provide information about potential messages. If the messaging parameter is set to 1, there is short message paging for either system information modification or Public Warning System (PWS), Earthquake and Tsunami Warning System (ETWS), or Commercial Mobile Alert System (CMAS) notification. The system can maintain the value to 1 as long as the normal short message indicator in 5G PDCCH DCI 1_0 with P_RNTI is enabled in order to make sure all the Ues will have a chance to wake up and detect it from the AMIB of the Alert Channel. If the messaging parameter set to 0, there is no short message paging.

Figure 7:
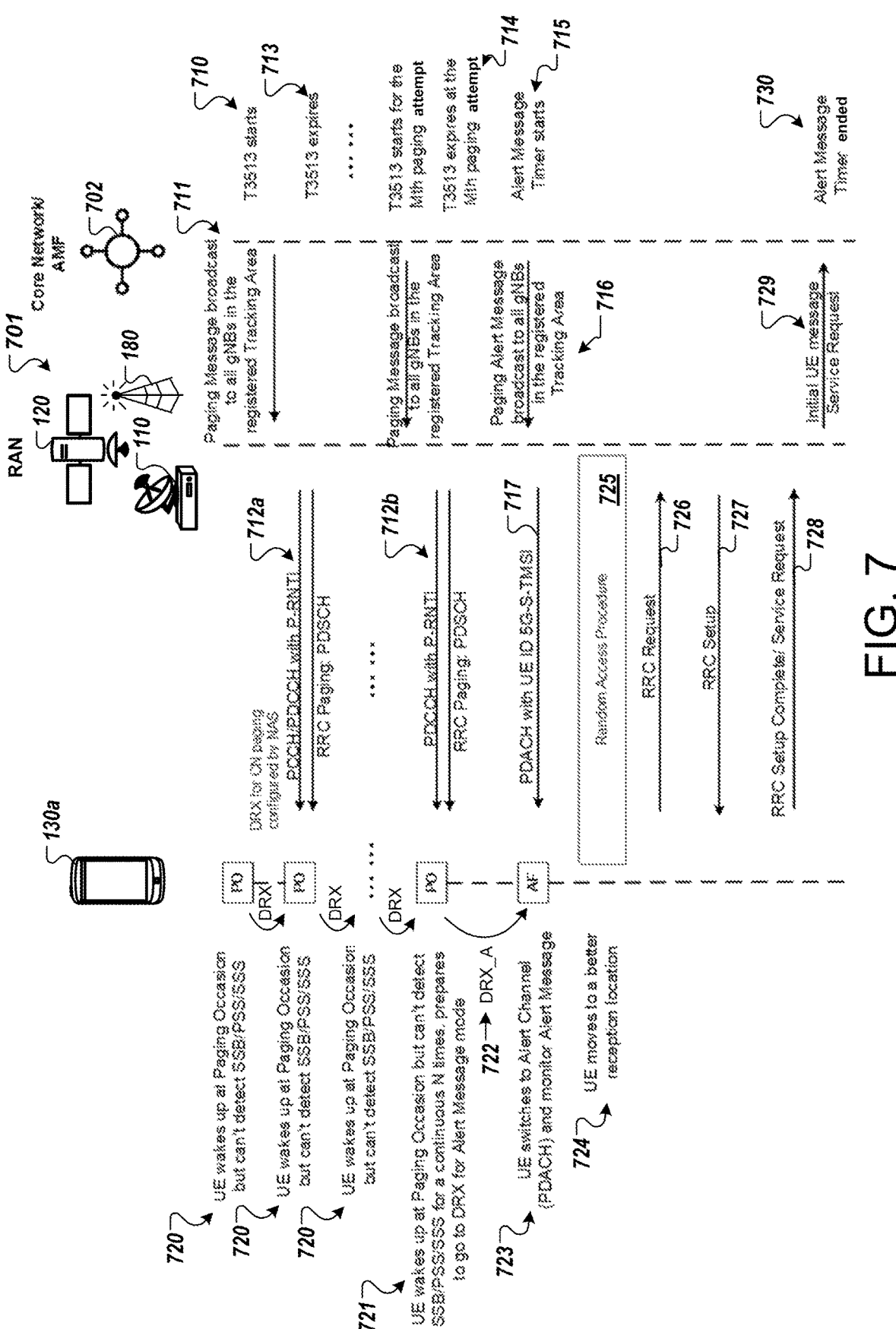
FIG. 7 is a block diagram that illustrates a system notifying a UE of an incoming call using standard paging and the paging alert channel.

FIG. 7 is a block diagram that illustrates the system 100 notifying the UE 130a of an incoming call using standard paging and the paging alert channel. The example in FIG. 7 shows the process of using the physical downlink paging alert channel (PDACH) to assist paging the UE 130a. Initially, standard paging attempts are made, and after the normal paging attempts expire (e.g., T3513 expiration), then the network switches to sending paging alerts on the paging alert channel (PDACH). The example shows the UE 130a, a radio access network (RAN) 701, and the Core Network and Access & Mobility Management Function (AMF) 702 (referred to below simply as "Core Network 702").

The RAN 701 can include the satellite gateway 110 and satellite 120 and/or the one or more terrestrial base stations (e.g., gNodeB or gNB) 180. The paging alert channel and associated paging alert messages can be sent using a satellite access network or ground-based cellular network as the RAN 701. In some implementations, the UE 130a may switch between the satellite and cellular radio access technologies or hand off from one to the other depending on signal strength, location, or other factors. Thus, the functions of the RAN 701 may be performed by either type of radio access network or both.

It is important to ensure that paging messages are successfully received by the corresponding users. For satellite transmissions to a UE such as a handset, the connection is very power limited. In many cases, a line of sight is needed to get a sufficiently high SNR to transmit and receive. If the UE is in a building, the attenuation through the roof and walls may make the signal not receivable from the satellite to handset. When the satellite pages a UE, such as to notify the UE of an incoming call, it is important for the UE to detect page so the UE can ring and notify the user. When the signal is too weak, however, the UE may not detect the paging signal and so may not receive an incoming call or message.

If the UE 130a wakes up at normal Paging Occasion (PO) in a Paging Frame (PF) and cannot detect any of the NG NR synchronization signals (e.g., PSS/SSS/SSB) at all, the UE will go back to sleep and wake up at next PO to check paging message. After the UE 130a fails to detect NG NR synchronization signals for continuous N times (where N is a configurable threshold number of paging occasions, which can be set by the UE and/or the core network), the UE 130a will tune to the dedicated Physical Downlink Paging Alert channel (PDACH) as mentioned before to wake up at the specific Alert Frame designated for the UE 130a to monitor for a paging alert message.

When there is a paging message initiated by the Core Network 702, the AMF will start paging timer T3513 and notify base stations (gNBs) in the Tracking Area (TA) of the UE 130a, all the gNBs in the TA will try to send the normal paging message at the assigned paging occasion (PO) of the UE 130a, such as defined by the applicable 3GPP standards. The AMF will initiate retransmission of a standard paging message if there is no response from the UE 130a before the T3513 paging timer expires.

After reaching a maximum number of paging attempts M, the AMF will start an Alert Channel Timer and notify the portion of the RAN 701 that serves the tracking area to send the paging alert message to the UE 130a at the corresponding Alert Frame in the dedicated paging alert channel periodically. The alert channel period (e.g., the alert cycle duration, which indicates the amount of time between successive paging alert messages for the UE 130a) will be broadcast in Master Information Block of the alert channel. After the AMF receives the response from the UE 130a, the Alert Channel Timer is stopped. The Alert Frame is defined using the System Frame Number which is a 10-bit integer. As discussed above, the Alert Frame can be defined using a larger counter, such as the combination of the System Frame Number and at least a portion (e.g., 4 LSBs) of the Hyperframe Number, such as to create the 14-bit frame counter discussed above. The timing of the Alert Frames for the UE 130a is calculated by the same algorithm by both the core network 702 (and/or base stations or gateways of the RAN 701) and the UE 130a.

When the UE 130a detects there is RRC paging alert message for it in its Alert Frame, the UE 130a will notify its user to move to a better reception location to respond to the RRC paging message by starting random access. For System Information Modification and PWS/ETWS notification (Short Message) paging, the UE 130a will move to a better reception location to scan for SIBs to receive the short messages.

In further detail, the example includes the core network 702 determining that an incoming call has been initiated for the UE 130a. The core network 702 starts the T3513 paging timer (710) and broadcasts a paging message to cause the RAN 701 to transmit a paging message for the UE 130a in the Tracking Area (711). The RAN 701 sends the paging message (712a), for example using PCCH/PDCCH with P-RNTI and/or RRC Paging using the PDSCH. The core network 702 waits until the paging timer expires (713), and if no response is received before that expiration, the core network 702 causes the RAN 701 to send another paging message (712b). The paging messages are sent repeatedly in the appropriate paging occasions for the UE 130a, until a maximum number of paging attempts, M, has been made. When the core network 702 detects that the threshold number of paging attempts M has been made without a response from the UE 130a (714), the core network 702 starts an alert message timer (715) and instructs the RAN 701 to send a paging alert message using the paging alert channel (716). The RAN 701 then sends a paging alert message (717) in the Alert Frame (AF) that the RAN 701 calculates as corresponding to the identifier for the UE 130a (e.g., based on the UE's 5G-S-TMSI), as discussed with respect to FIG. 6.

Meanwhile, the UE 130a initially operates in a sleep state, such as RRC Idle or RRC Inactive, and uses discontinuous reception (DRX) or extended discontinuous reception (eDRX) to periodically attempt to monitor the channels to receive paging messages (720). However, for several paging occasions in a row, when the UE 130a turns on the radio to monitor for paging messages, the UE 130a cannot detect any of the NG NR synchronization signals (e.g., PSS/SSS/SSB) due to very low SNR. The UE 130a determines that the maximum number N of consecutive paging occasions have passed without the ability to receive the synchronization signals (721), and in response switches to perform discontinuous reception on the alert channel (DRX_A) (722). The UE calculates which Alert Frame(s) to monitor using its identifier (e.g., based on the UE's 5G-S-TMSI) and the techniques discussed with respect to FIG. 6. When the UE 130a switches to monitor the alert channel in the calculated alert frame (723), the UE 130a receives the transmitted alert message, which specifies the identifier for the UE 130a to indicate that a page is pending. By accumulating signals over the duration of the alert frame, the UE 130a receives the many repetitions in the alert message to allow the effective SNR for the alert message content to reach a usable level.

When the UE 130a receives the paging alert message and determines that the alert is for the UE 130a, the UE 130a notifies its user. The user moves the UE 130a to a location with better reception (724), where the UE 130a uses a random access procedure (725) to establish a connection with the RAN 701. The UE 130a can send an RRC connection request 726 and receive an RRC setup message 727. The UE 130a sends a service request 728 indicating that RRC setup is complete. The RAN 701 then communicates with the core network 702 to send the initial message from the UE 130a (729), which is a service request. The core network 702 then ends the alert message timer (730), because the UE is now in a position to connect and receive service, including any paging messages intended for the UE 130a.

Figure 8:
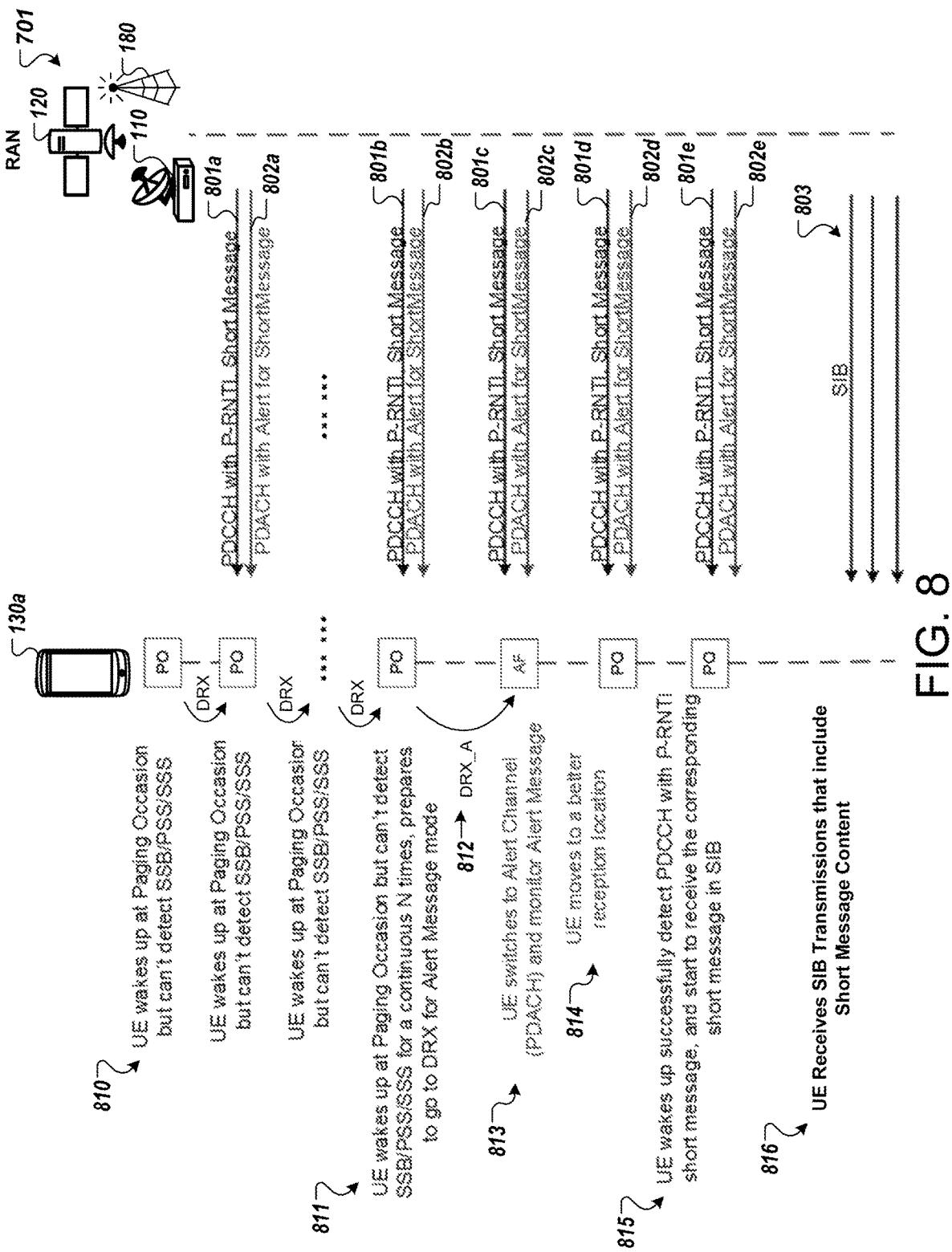
FIG. 8 is a block diagram that illustrates a system notifying a UE of an incoming message using standard paging and the paging alert channel.

FIG. 8 is a block diagram that illustrates a system notifying the UE 130a of an incoming message using standard paging and using the paging alert channel. The example shows an example of short message paging procedure when the UE 130a is in RRC Idle state or RRC Inactive state. The RAN 701 can be configured to provide concurrently perform paging for a short message using standard paging on the PDCCH and using paging alerts on the paging alert channel (PDACH). The paging occasions for standard paging and the alert frames for paging alerts generally do not coincide, and the timing can be determined separately for each paging technique. Nevertheless, the RAN 701 can concurrently perform standard paging in an ongoing manner (e.g., over a series of paging occasions) while the RAN 701 also sends paging alert messages in an ongoing manner (e.g., over a series of alert frames for paging alert messages). In some implementations, paging messages and paging alerts may be provided for a UE 130a in the same hyperframe, and both paging messages and paging alerts can be provided in multiple successive hyperframes. In other situations, the paging messages and paging alerts may not coincide in the same hyperframes, but may nevertheless both be transmitted repeatedly, in an ongoing manner, in the paging occasions and alert frames corresponding to the UE 130a, without the switching between standard paging and paging alerts that is shown in FIG. 7.

Short message paging can be performed for System Information Modification and ETWS/CMAS indications (Short Message), and is often done using PDCCH Downlink Control Information (DCI) format 1_0 with Paging Radio Network Temporary Identifier (P_RNTI) and a short message. These messages can be intended for many or all UEs in the coverage area. In order to ensure successful notification to all the UEs in the coverage area, the paging alert message for short message paging can be set using a 1-bit entry in the AMIB providing paging alert information. For example, while the RAN 701 is sending short message pages, it sets the paging alert message entry for short message bit to "1" in the AMIB. When there is no short message paging, the bit is set to "0" in the AMIB.

The duration of time that the paging alert type bit is set to one and the duration of time over which the short message paging is continued have to be long enough for UEs to respond and be moved to a location with better reception so they can receive the short message paging. After a UE successfully detects the paging message at its paging occasion (PO) after moving to a better reception location, it will start to decode the System Information Blocks (SIBs) for system information update or ETWS/CMAS.

In further detail, when a short message is available for the UE 130*a*, the RAN 701 transmits a page on the PDCCH with P-RNTI and a short message, timed to align with a paging occasion (PO) of the UE 130*a* (801*a*). The RAN 701 also sends a paging alert message for the short message using the paging alert channel (PDACH) to signal that there is a page for a short message pending (802*a*). The paging alert message is timed to align with the alert frame for the UE 130*a*, and the alert frame generally has a different starting time and duration than the paging occasion for standard paging. The RAN 701 continues standard paging with additional pages in subsequent paging occasions for the UE 130*a* (802*b*-802*e*), and the RAN 701 also continues sending paging alert messages in subsequent alert frames (AFs) for the UE 130*a* (802*b*-802*e*). The RAN 701 continues both notification techniques concurrently for a duration that all UEs can detect the paging successfully. The RAN 701 also sends the system information blocks (SIBs) that include message content of the short message (803).

The UE 130*a* initially is in an RRC Idle state or RRC inactive state. The UE 130*a* uses discontinuous reception (DRX) or extended discontinuous reception (eDRX) to periodically attempt to monitor the PDCCH to receive paging messages (810). However, for several paging occasions in a row, when the UE 130*a* turns on the radio to monitor for paging messages, the UE 130*a* cannot detect any of the NG NR synchronization signals (e.g., PSS/SSS/SSB) due to very low SNR. The UE 130*a* determines that the maximum number N of consecutive paging occasions have passed without the ability to receive the synchronization signals (811), and in response switches to perform discontinuous reception on the alert channel (DRX_A) (812). The UE calculates which Alert Frame(s) to monitor using its identifier (e.g., based on the UE's 5G-S-TMSI) and the techniques discussed with respect to FIG. 6. When the UE 130*a* switches to monitor the alert channel in the calculated alert frame (813), the UE 130*a* receives the transmitted alert message (e.g., transmission 802*c* in the example), which indicates that a short message page is pending. By accumulating signals over the duration of the alert frame (AF), the UE 130*a* receives the many repetitions of the signals within the alert message to allow the effective SNR for the alert message content to reach a usable level.

When the UE 130*a* receives the paging alert message and determines that the alert is for the UE 130*a*, the UE 130*a* notifies its user. The user moves the UE 130*a* to a location with better reception (814), where the UE 130*a* has sufficient SNR to successfully receive a paging message in a subsequent paging occasion (815). The UE 130*a* can then start to receive the short message in the SIB transmissions (816).

FIGS. 9-11 show how AMIB blocks can be structured to facilitate paging alerts on the PDACH. For example, FIGS. 10 and 11 show elements of the AMIB and show new or changed elements with underlining. These changes show very efficient ways to enable the versatility to specify different amounts of repetition (e.g., through two Repetition Control Bits) and to include the needed information in 34 bits or 24 bits.

FIG. 9 is an example of information in a master information block (MIB) 900 for NB-IOT. The MIB 900 can represent a MIB transmitted on the NPBCH, which can be repeated periodically, such as every 640 ms. The MIB 900 has a size of 34 bits.

The MIB 900 includes information such as four MSBs of the system frame number 901 (4 bits). The 6 least significant bits of the SFN are acquired implicitly by decoding the NPBCH. Two LSBs of a hyperframe number 902 (2 bits) are also included. The MIB 900 also includes an integer for scheduling information (SIB-NB1) 903 (4 bits), an integer for system information 904 (5 bits), and a boolean value 905 (1 bit) for indicating whether access barring is enabled. The MIB 900 also includes a value indicating an operation mode 906 (2+5 bits) (e.g., selected from among 4 choices). The choices include Inband-SamePCI indicating an in-band deployment and that the NB-IOT and LTE cell share the same physical cell identifier and have the same number of NRS and CRS ports, Inband-DifferentPCI indicating an in-band deployment and that the NB-IOT and LTE cell have different physical cell identifiers, guardband indicating a guard-band deployment, and standalone indicating a stand-alone deployment. The MIB 900 includes an additional transmission SIB boolean value 907 (1 bit), where the value "true" indicates that additional SIB1-NB transmissions are present. The MIB 900 includes a Boolean value ab-Enabled-5GC 908 (1 bit), where the value "true" indicates that access barring is enabled for UEs connected to 5GC. The MIB 900 includes a partial EARFCN-r17 value 909 (1+2 bits), and earfcn-LSB indicates the 2 least significant bits of the E-UTRA Absolute Radio Frequency Channel Number (EARFCN) for NTN bands where 100 kHz raster is used. The MIB also has a 6-bit spare or unused section 910.

FIG. 10 shows information in an example of an alert master information block (AMIB) 1000 adapted for the paging alert channel. The AMIB 1000 is a modified version of the NB-IOT MIB 900. The AMIB 1000 will maintain the same size of 34 bits and will follow the implementation of the NPBCH channel with a different definition of the 34-bit entry, which will only affect the bit parsing of the decoded bits. This arrangement and other features described herein can facilitate compatibility of the paging alert channel with existing UE hardware, allowing use of the paging alert channel with minimal software and/or firmware updates.

Various changes to the NB-IOT MIB 900 can be made to support the paging alert channel. For example, the system will not keep the Narrow band physical downlink control channel (NPDCCH) channel to reduce overhead and simplify the alert channel control. Some SIB related entries will be removed, including (1) the SIB-NB1 scheduling information 903 (4 bits) and (2) the additional transmission SIB value 907 (1 bit). Because SIB signaling is removed, some of the SIB1 information relevant to the alert channel control shall be included. For example, two additional bits of Hyperframe number (bit 2 and bit 3) which used to be in SIB1, will provided because these are used to allow longer alert cycles. In general, the user of a UE will need some time to respond to the paging alert message and notification to move to an area with better signal quality. As a result, a longer Alert Cycle in terms of hundreds of seconds or even minutes is often needed. The corresponding alert channel timer at AMF Alert Channel has to be long enough to avoid unnecessarily frequent retransmission. The AMIB 1000 also includes new entries for alert channel control, such as repetition control bits 1008 and the alert cycle control bits 1009. Other parameters can also be specified.

For example, the AMIB 1000 includes a system frame number 1001 (4 bits). The AMIB 1000 includes four LSBs of the hyperframe number 1002 (4 bits), instead of two LSBs as in the MIB 900. The 4 LSBs of the hyperframe number are combined with the 10-bit System Frame Number to cover a longer time duration. The AMIB 1000 includes a system information value tag 1003 (5 bits), an access barred enabled Boolean value 1004 (1 bit), an operation mode information value 1005 (2 bits+5 bits), an access barred enabled 5GC Boolean value 1006 (1 bit), and a partial EARFCN value 1007 (1 bit+2 bits).

The AMIB 1000 also includes repetition control bits 1008 (2 bits) ("alertChannelRepetitionNum"). The repetition control bits 1008 define the number of repetitions of paging alert signals within each paging alert message. The repetition number can be different for different satellite beams, so that each beam can achieve reception in targeted low SNR for the paging alert channel. The RAN 701 can set the repetition control bits 1008 for each beam based on the end of coverage (EOC) SNR for the beam, with beams having lower SNR being using higher numbers of repetitions, as needed, to achieve an effective SNR level when accounting for the repetition gain from accumulating repetitions in the paging alert message.

As discussed above, the repetition control bits 1008 specify one of different predetermined options for the numbers of repetitions of paging alert signals per paging alert message. For example, the four 2-bit sequences that are possible for the repetition control bits 1008 can respectively represent 30 repetitions, 60 repetitions, 120 repetitions, and 240 repetitions. UEs can store in advance information indicating the meaning of the different bit sequences for the repetition control bits 1008. As a result, the number of repetitions within each paging alert message (and consequently the length of each paging alert message) can be selectable by the system, and can be specified to the UE through the repetition control bits 1008. In the example, the lowest of the four numbers of repetitions (e.g., 30) is a value that is selected so that paging alert messages remain aligned with frame boundaries. The other numbers of repetitions are multiples of this baseline or reference value. Also in the example, after the lowest number of repetitions, each successively larger number of repetitions is double the previous number. This helps provide a large range of repetition gains that can be achieved (e.g., from 14.77 dB for 30 repetitions to 23.80 dB for 240 repetitions as shown in table 400 in FIG. 4) even with only two bits in the AMIB 1000.

The AMIB 1000 also includes alert cycle control bits 1009 (3 bits) ("alertCyclePeriod"), which specify one of several different predetermined options for the alert frame duration. For example, the eight different values for the alert cycle control bits 1009 can respectively specify an alert cycle duration, in number of frames, of 128, 256, 512, 1024, 2048, 4096, 8192, and 16384. UEs can store in advance information that maps different bit sequences of the alert cycle control bits 1009 to corresponding numbers of frames. The alert cycle duration indicated by the alert cycle control bits 1009 defines how often each UE should wake up to monitor the paging alert channel, e.g., the periodicity of alert frames for each UE.

The AMIB 1000 includes a paging occasion threshold 1010 (3 bits) ("POmissNumberbeforeAlertChannel"), which will be initialized with a default value in the UE and can be dynamically modified by the Core Network by changing the 3-bit entry in the MIB of NPBCH. It indicates the number of paging occasions (e.g., consecutive paging occasions, in total) that would be missed (e.g., the UE cannot detect the synchronization signal to be able to effectively monitor the standard paging messages) before the UE should switch to monitor the paging alert channel. The MIB also includes a short message indicator value 1011 (1 bit) ("AlertShortMessage") that indicates whether there is a short message page pending in the PDCCH with P-RNTI.

The changes shown for the AMIB 1000 of FIG. 10 compared to the MIB 900 of FIG. 9 are examples, and different system operators can decide to have a different enumeration of the entries for alert cycle control. For example, three bits may be allocated for the repetition control bits 1008 instead of two bits, to allow eight different options for the number of repetitions within each paging alert message. In addition, the alert cycle control bits 1009 may be reduced from 3 bits to 2 bits, to provide four options for selecting the alert cycle duration instead of eight. As another example, the paging occasion threshold 1010 may be specified with an enumerated set of options, rather than with an integer, such as to allow four selectable options of different threshold values while freeing up a bit to be allocated to the repetition control bits 1008 or the alert cycle control bits 1009 to increase precision for those parameters. For example, an operator can select one of the multiple options in the set to provide a number of repetitions that provides a desired tradeoff between the level of SNR improvement for reception and the number of paging alert opportunities provided. In addition, the mappings between the bit sequences for the repetition control bits 1008 or the alert cycle control bits 1009 can be set differently to provide selectable options in an appropriate range for a given implementation.

FIG. 11 shows information in another example of an alert master information block (AMIB) 1100 for the paging alert channel. The AMIB 1100 has a reduced size of 24 bits, which is achieved by omitting several elements of the AMIB 1000 of FIG. 10. For example, the AMIB 1100 omits the access barred enabled value 1004 (1 bit), the operation mode information value 1005 (7 bits), and the partial EARFCN value 1007 (3 bits). This frees up 11 bits, leaving one spare bit in the 24-bit AMIB 1100.

Figure 12:
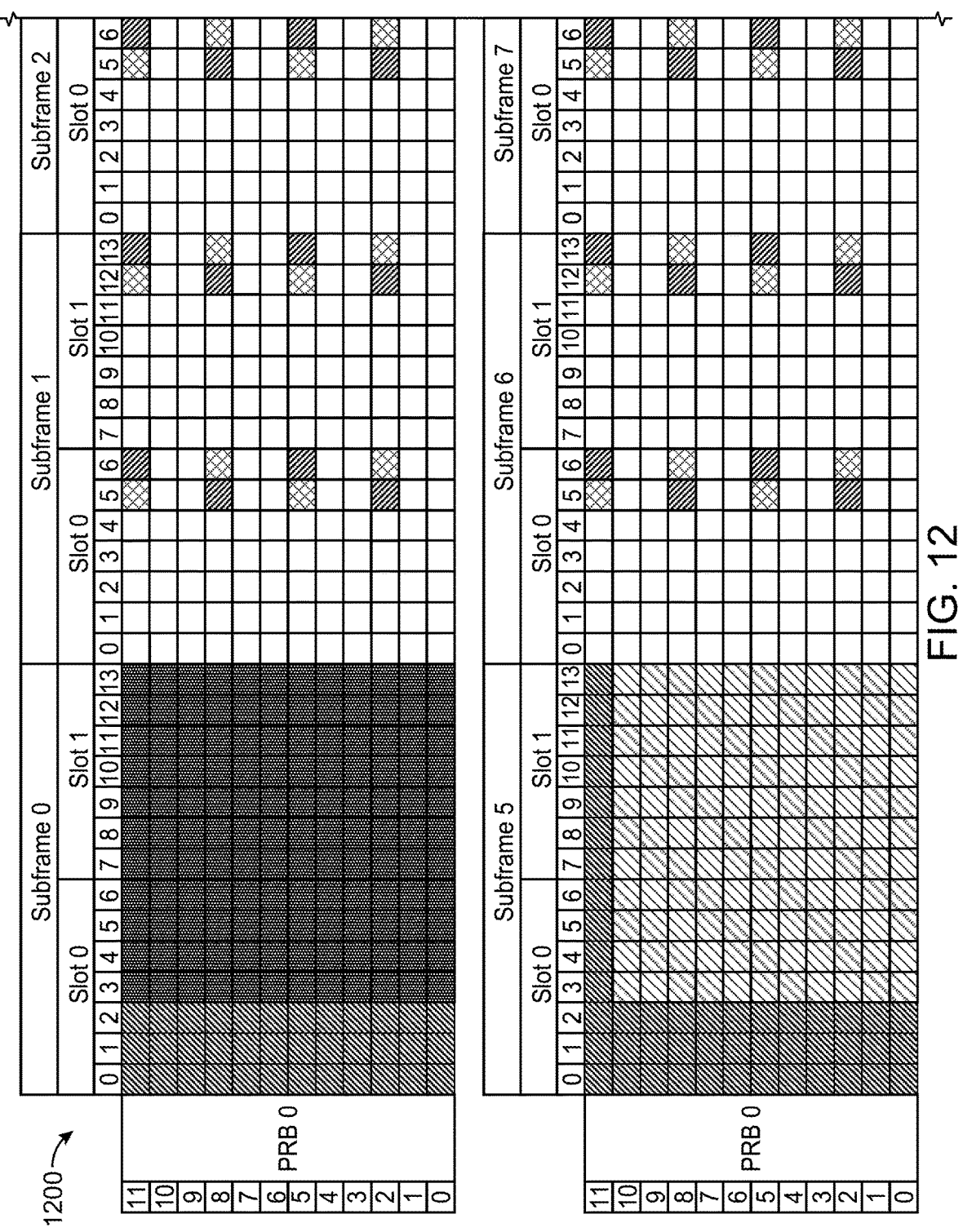
FIG. 12 is a diagram showing an example of downlink frame structure for 3GPP NB-IOT.
Figure 12:
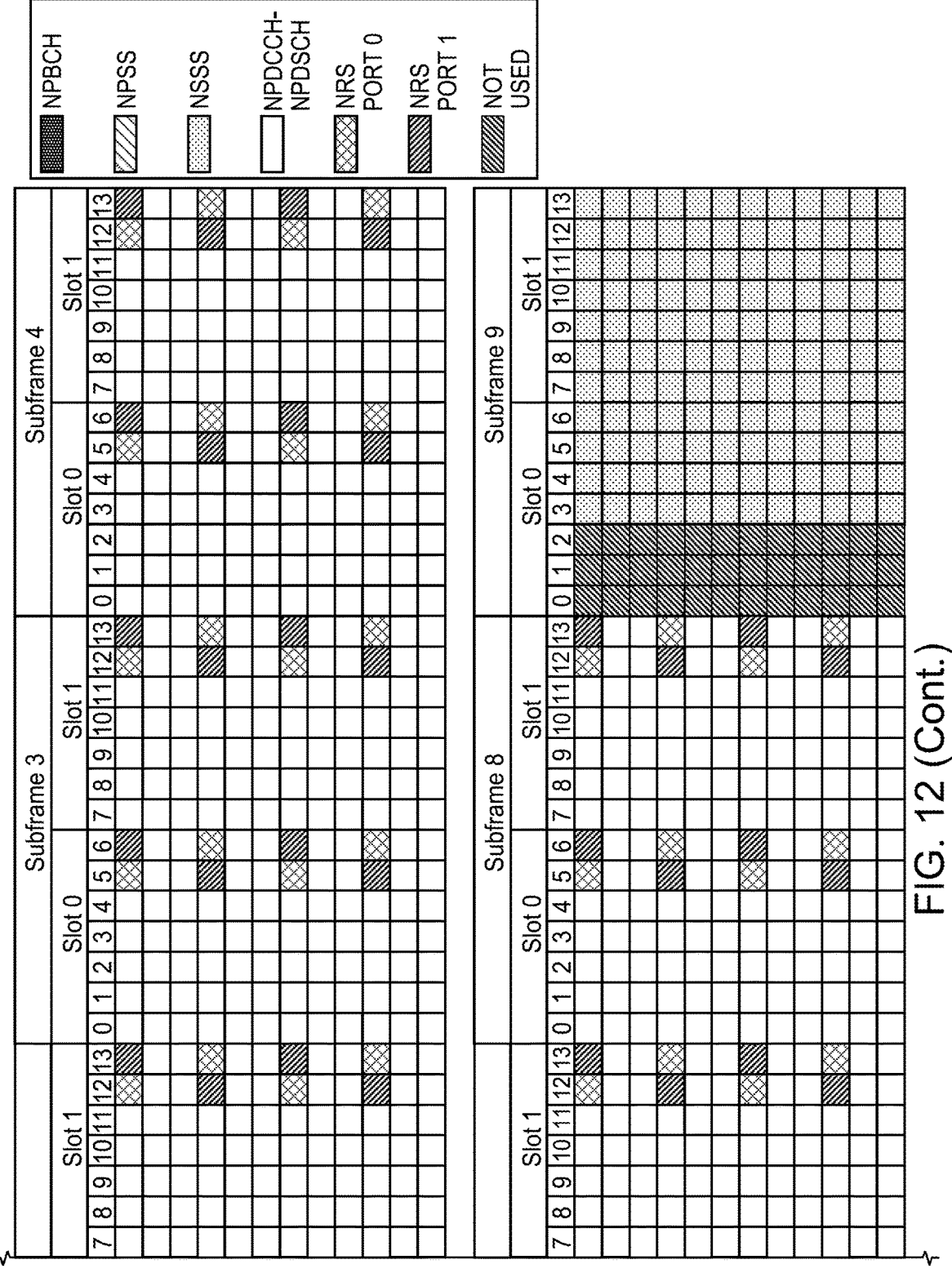

FIG. 12 is a diagram showing an example of downlink frame structure 1200 for 3GPP NB-IOT. The example shows one frame, representing 10 milliseconds of time. In the time dimension, shown along the horizontal axis, the downlink frame structure 1200 shows 10 sub-frames (labeled 0-9), with each sub-frame being divided into two slots (labeled 0-1), and each slot having 7 OFDM symbols (with symbols in Slot 0 labeled 0-6 and symbols in Slot 2 labeled 7-13). Along the vertical axis, there is one Physical Resource Block (PRB) labeled PRB 0 (e.g., a 180 KHz bandwidth), which is divided into 12 subcarriers (labeled 0-11). Each symbol period for one of the subcarriers in the PRB is a Resource Element (RE), so each sub-frame includes 12 subcarriers*2 slots*7 REs per slot=168 REs.

When using the paging alert channel, the NPBCH (narrow band physical broadcast channel) is used to carry the Master Information Block (MIB) and the NPSS/NSSS (primary and secondary synchronization signals) are used for synchronization. As a result, UEs can make use of the paging alert channel using of existing receiver hardware. Narrowband Reference Signals (NRS), e.g., NRS Port 0 and NRS Port 1 signals, are used for equalization and phase correction. The NPDCCH/NPDSCH regions, which are the majority of the frame, can be used to transmit identifiers for UEs, to indicate which UEs are being alerted about incoming calls for which standard paging messages were not acknowledged. The paging alert system can use a 34-bit information block, such as the AMIB 1000 of FIG. 10, to re-use the existing encoder used for 5G communication.

A paging alert channel waveform, similar to an NB-IOT waveform, can occupy one Resource Block (180 KHz), and may provide relatively low throughput but high reliability of service by exploiting repetition of the transmitted data (e.g., multiple repetitions of the paging alert signals within each paging alert message). Each time the number of repetition is doubled, SNR will be improved by a maximum of 3 dB. Similar to NB-IOT, the paging alert channel can make use of several downlink signals and downlink channels:

Downlink signals:

NPSS/NSSS (primary and secondary synchronization signals)

RS (cell reference signals)

Downlink channels

NPBCH (physical broadcast channel) to carry the Master Information Block (MIB)

NPDSCH (physical downlink shared channel)

For an odd radio frame, sub-frame 9 can be used for NPDSCH transmission. The entire NPDSCH resource block can be available for transmission in stand-alone and guard-band deployments.

The input to NPBCH encoder is the 34-bit MIB+16-bit CRC=50 bits (K=50) and output of channel coding is 150 in total (e.g., each of three d[ ] arrays is 50 bits). The coding method can be based on, for example, 36.212-5.1.3.1 Tail biting convolutional coding, with a code rate of $\frac{1}{3}$. The 150 bits will go through an interleaver, rate matching, scrambling and the final output is 1600 bits, which will be QPSK modulated to 800 symbols. Each NPBCH sub-frame includes 100 symbols and results in 8 sub-frames and repeats 8 times. The NPBCH has a 640 ms transmission time interval (TTI) in which every sub-frame 0 carries a code sub-block. The code rate can be calculated as code rate=(34 MIB+16CRC)/(100REs*8 subframes*2 bits)=0.0313.

As another example, the calculation of resource elements (REs) per sub-frame can be 12*14−2*8(2-port NRS)=152 REs per NPDCCH/NPDSCH sub-frame. The system can choose two ports for NRS, or an in-band frame structure, and the difference is the code rate for the paging message will be a little bit higher, and the alert frame scheduling results won't be affected. In this situation, efficiency in two frames is 15 ms/20 ms=75%.

Figure 13:
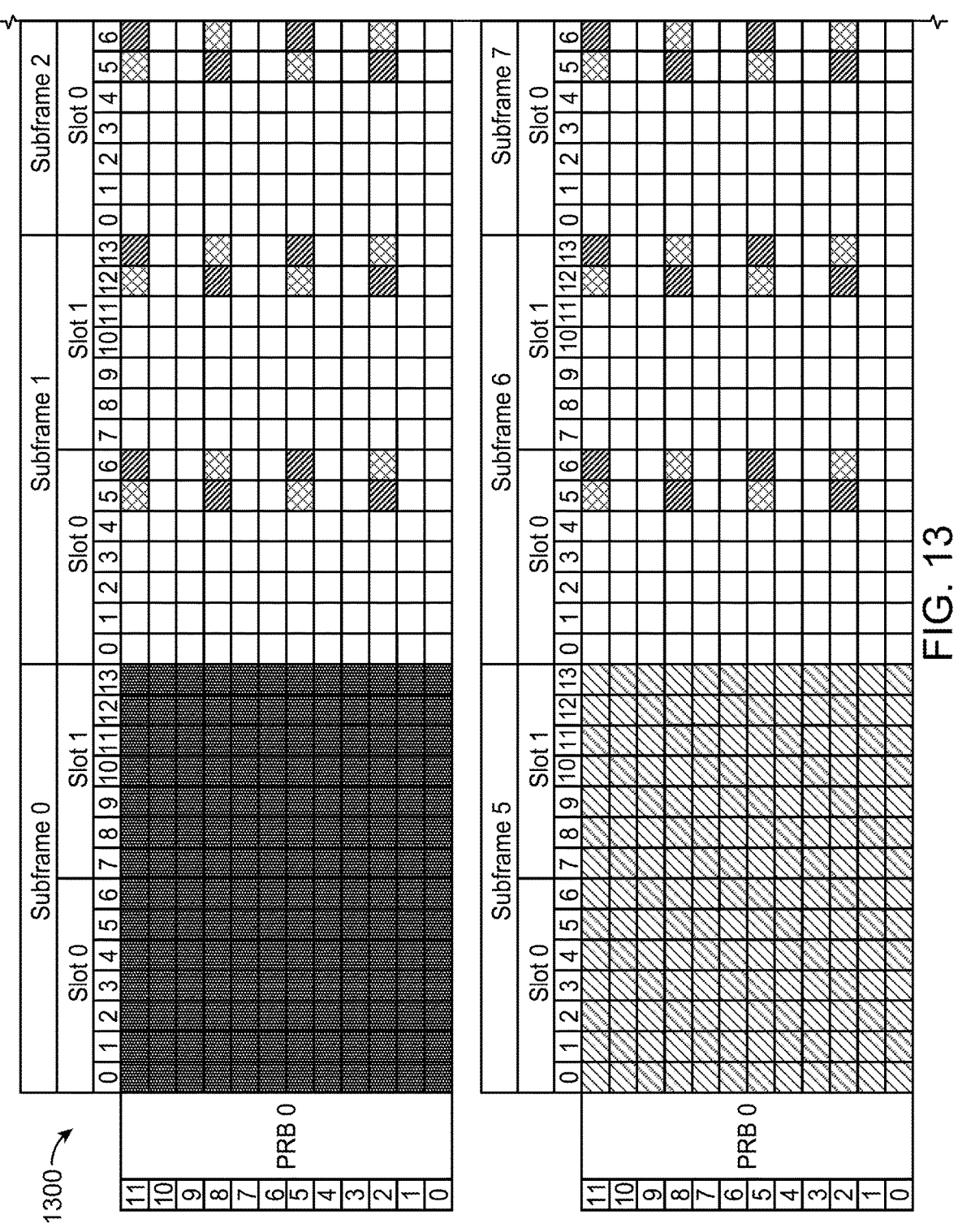
FIG. 13 is a diagram showing an example of downlink frame structure for a paging alert channel that provides reduced overhead compared to the NB-IOT frame structure.
Figure 13:
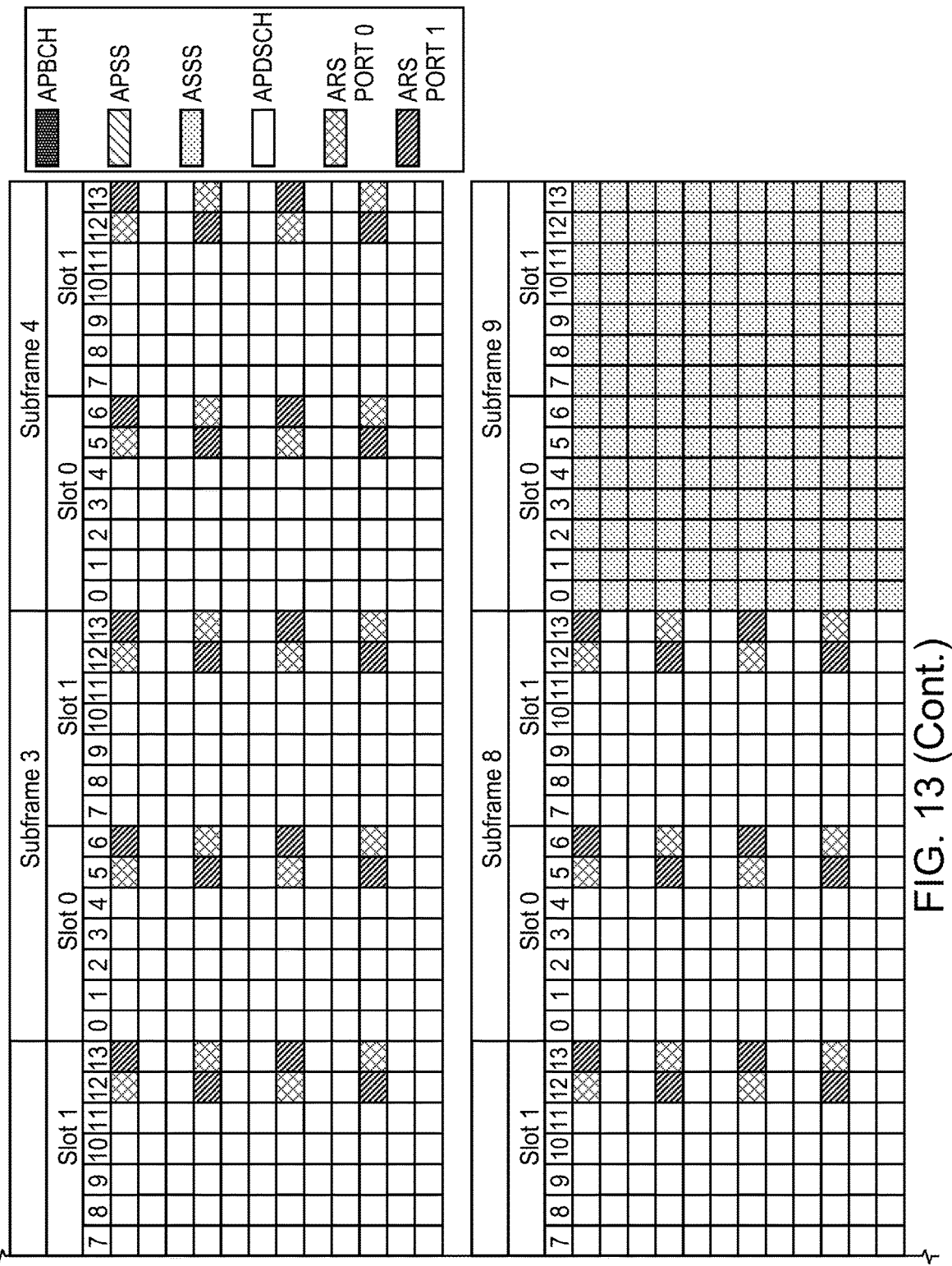

FIG. 13 is a diagram showing an another example of downlink frame structure 1300 for a paging alert channel that provides reduced overhead compared to the NB-IoT frame structure. For example, the illustrated example shows a variant for adapting LTE NB-IOT downlink frame structure for guard-band or stand-alone mode with reduced overhead. The downlink frame structure 1300 is intended to be used with the 24-bit AMIB 1100 of FIG. 11, and the REs can be filled to decrease the code rate and make the system more reliable, although this would increase the number of changes needed with respect to NB-IOT MIB encoding and decoding.

In the time dimension, shown along the horizontal axis, the downlink frame structure 1300 shows 10 sub-frames (labeled 0-9), with each sub-frame being divided into two slots (labeled 0-1), and each slot having 7 orthogonal frequency-division multiplexing (OFDM) symbols (with symbols in Slot 0 labeled 0-6 and symbols in Slot 2 labeled 7-13). Along the vertical axis, there is one Physical Resource Block (PRB) labeled PRB 0 (e.g., a 180 kHz bandwidth), which is divided into 12 subcarriers (labeled 0-11). Each symbol period for one of the subcarriers in the PRB is a Resource Element (RE), so each sub-frame includes 12 subcarriers*2 slots*7 REs per slot=168 REs.

In the example the paging alert channel can make use of several downlink signals and downlink channels. These signals in the alert channel are renamed from the NB-IOT names to represent that they are adapted variants, with the initial "narrow band" label being replaced with "alert" or adapted, so that the NPBCH, NPSS, NSSS, NRS, and NPDSCH have adapted versions denoted as APBCH, APSS, ASSS, ARS, and APDSCH, respectively.

Downlink signals:

APSS/ASSS (primary and secondary synchronization signals)

ARS (cell reference signals)

Downlink channels

APBCH (physical broadcast channel) to carry the Master Information Block (MIB)

APDSCH (physical downlink shared channel)

In the example, the code rate is (24 bits of MIB+16 bits of CRC)/{(12*14−16 ARS)*8 subframes*2 bits}=0.0164. The APSS/ASSS can fill all the Resource Elements in the corresponding sub-frame for better synchronization performance due to a longer APSS/ASSS sequence. The frame structure 1300 has 12*14−16 (2 ports ARS)=152 REs per APDSCH subframe. The system can use two ports for NRS (labeled ARS), or an in-band frame structure, the only difference is the code rate will be a little bit higher, and all the AF scheduling results won't be affected. Efficiency in two frames is 15 ms/20 ms=75%.

There are several options for coding for the paging alert messages. One option is to use the 5G NR PDSCH low density parity check (LDPC) code, for which there is a decoder available in the NR receiver. Another option is to use the NB-IOT PDSCH LTE tail-biting convolutional code (TBCC). For example, as with the LTE PDCCH the transmission can use a tail-biting k=7, r=$\frac{1}{3}$ convolutional code, and for CRC the system can use 24 bits or 8 bits. As another option, a new code may be designed and the appropriate new decoder can be included in the UE and the base stations (e.g., gNB) and other RAN components (e.g., satellite gateway 110, satellite 120, etc.). In some implementations, a Turbo Code may provide better characteristics for a 48-bit paging alert message than the current LDPC codes for PDSCH channel. In general, it is preferable to use as low of a code rate as possible. For example, if a new Turbo Code is used with very low code rate, the system can perform repetition to extend the SNR to get better performance. The lower code rate for this special purpose may require more memory for the decoder, and so the decoder memory may be supplemented to support the change. A tradeoff between efficiency (e.g., lowering code rate) and memory requirements of the decoder (e.g., increased memory) can be set when implementing the system. The paging alert channel generally omits hybrid automatic repeat request (HARQ) for simplicity, preferring instead to target lower error rates for more reliable transmission to avoid further delay.

The techniques of using a paging alert channel as discussed above can be used for many different wireless communication technologies, such as 5G, 4G, and LTE. The techniques can be used with other communication technologies, standards, and protocols also.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method performed by one or more communication devices, the method comprising:
  identifying, by the one or more communication devices, a user equipment to be paged;
  causing, by the one or more communication devices, one or more paging messages to be transmitted to the user equipment, the one or more paging messages transmitted using either: a paging control channel (PCCH), physical downlink control channel (PDCCH), or radio resource control paging (RRC) using a physical downlink shared channel (PDSCH);
  determining, by the one or more communication devices, that a response to the one or more paging messages is not received from the user equipment; and
  in response to determining that a response to the one or more paging messages is not received from the user equipment, causing, by the one or more communication devices, a paging alert message for the user equipment to be transmitted on a paging alert channel designated for transmitting paging alerts that is distinct from the PCCH, PDCCH, and PDSCH, wherein
    the paging alert message comprises repeated paging alert signals for the user equipment.

2. The method of claim 1, wherein the paging alert message for the user equipment comprises a plural number of consecutive instances of the paging alert signals for the user equipment.

3. The method of claim 1, wherein the paging alert signals indicate an identifier for the user equipment.

4. The method of claim 3, further comprising:
  encoding the identifier for the user equipment; and
  modulating the encoded identifier for the user equipment.

5. The method of claim 1, comprising causing, by the one or more communication devices, an alert master information block (AMIB) for the paging alert channel to be transmitted, wherein the AMIB includes data indicating (i) a number of repetitions of paging alert signals in individual paging alert messages or a duration of individual paging alert messages, and (ii) a duration of an alert cycle for the paging alert channel.

6. The method of claim 5, wherein the AMIB includes (i) at least a portion of a system frame number (SFN) and (ii) at least a portion of a hyper frame number (HyperSFN).

7. The method of claim 5, wherein the AMIB includes a short message paging indicator value that specifies whether a short message is pending for a receiver.

8. The method of claim 7, wherein the short message paging indicator value specifies whether the receiver should tune to receive system information blocks (SIBs) for a public safety message or a system update.

9. The method of claim 7, wherein the short message paging indicator value is a single bit.

10. The method of claim 1, comprising causing, by the one or more communication devices, an alert master information block (AMIB) for the paging alert channel to be transmitted, wherein the alert master information block for the paging alert channel specifies an alert cycle duration indicating a length of an alert cycle for the paging alert channel; and
  providing multiple paging alert messages to the one or more communication devices on the paging alert channel, wherein the multiple paging alert messages are spaced apart by a multiple of the alert cycle duration indicated in the AMIB.

11. The method of claim 1, comprising:
  determining a repetition control value that indicates a number of times that paging alert signals are repeated in a paging alert message; and
  comprising causing, by the one or more communication devices, an alert master information block (AMIB) for the paging alert channel to be transmitted, wherein the alert master information block for the paging alert channel includes the repetition control value; and
  wherein the paging alert message for the user equipment includes paging alert signals repeated the number of times indicated in the repetition control value of the AMIB.

12. The method of claim 11, wherein determining the repetition control value comprises selecting a repetition control value from among a predetermined set of multiple repetition control values, wherein each of the repetition control values represents a different number of repetitions of paging alert signals in a paging alert message.

13. The method of claim 12, further comprising determining an end-of-coverage signal-to-noise ratio for a satellite beam;
  wherein the repetition control value is selected based on the determined end-of-coverage signal signal-to-noise ratio.

14. The method of claim 12, wherein the predetermined set of multiple repetition control values includes a first repetition control value representing a first number of repetitions and one or more additional repetition control values that are integer multiples of the first number of repetitions.

15. The method of claim 12, wherein the multiple repetition control values respectively represent different numbers of repetitions that each represent a transmission duration that aligns with frame boundaries of a frame structure.

16. The method of claim 1, comprising causing, by the one or more communication devices, a synchronization signal to be transmitted on the paging alert channel.

17. The method of claim 1, comprising:
  determining, by the one or more communication devices, an identifier for the user equipment; and
  determining, by the one or more communication devices, a time to transmit the paging alert message based on the identifier;
  wherein causing the paging alert message for the user equipment to be transmitted on the paging alert channel comprises causing the paging alert message to be transmitted on the paging alert channel at the determined time.

18. The method of claim 17, wherein determining the time to transmit the alert message comprises determining an alert frame in which to transmit the paging alert message, wherein the alert frame is determined based on the identifier and a number of paging alerts per alert cycle.

19. A system comprising:
  one or more processors; and
  one or more computer-readable media storing instructions that are operable, when executed by the one or more processors, to cause one or more communication devices to perform operations including:

identifying, by the one or more communication devices, a user equipment to be paged;

causing, by the one or more communication devices, one or more paging messages to be transmitted to the user equipment, the one or more paging messages transmitted using either: a paging control channel (PCCH), physical downlink control channel (PDCCH), or radio resource control paging (RRC) using a physical downlink shared channel (PDSCH);

determining, by the one or more communication devices, that a response to the one or more paging messages is not received from the user equipment; and in response to determining that a response to the one or more paging messages is not received from the user equipment, causing, by the one or more communication devices, a paging alert message for the user equipment to be transmitted on a paging alert channel designated for transmitting paging alerts that is distinct from the PCCH, PDCCH, and PDSCH, wherein the paging alert message comprises repeated paging alert signals for the user equipment.

20. One or more non-transitory computer-readable media storing instructions that are operable, when executed by one or more processors, to cause one or more communication devices to perform operations including:

identifying, by the one or more communication devices, a user equipment to be paged;

causing, by the one or more communication devices, one or more paging messages to be transmitted to the user equipment, the one or more paging messages transmitted using either: a paging control channel (PCCH), physical downlink control channel (PDCCH), or radio resource control paging (RRC) using a physical downlink shared channel (PDSCH);

determining, by the one or more communication devices, that a response to the one or more paging messages is not received from the user equipment; and in response to determining that a response to the one or more paging messages is not received from the user equipment, causing, by the one or more communication devices, a paging alert message for the user equipment to be transmitted on a paging alert channel designated for transmitting paging alerts that is distinct from the PCCH, PDCCH, and PDSCH, wherein the paging alert message comprises repeated paging alert signals for the user equipment.

* * * * *